(12) United States Patent
Dispensa et al.

(10) Patent No.: US 11,016,981 B2
(45) Date of Patent: May 25, 2021

(54) COMPILING RESULTS FROM DIFFERENT SEARCH QUERIES

(71) Applicant: Equals 3 LLC, Minneapolis, MN (US)

(72) Inventors: Marcello Dispensa, Cranford, NJ (US);
Scott Litman, Minneapolis, MN (US);
Daniel Mallin, Minneapolis, MN (US);
Allen Chambers, Cinnamonson, NJ (US)

(73) Assignee: Equals 3 LLC, Minneapolis, MN (US)

( * ) Notice: Subject to any disclaimer, the term of this patent is extended or adjusted under 35 U.S.C. 154(b) by 363 days.

(21) Appl. No.: 15/592,842

(22) Filed: May 11, 2017

(65) Prior Publication Data

US 2017/0329829 A1 Nov. 16, 2017

Related U.S. Application Data

(60) Provisional application No. 62/335,812, filed on May 13, 2016.

(51) Int. Cl.

| | |
|---|---|
| G06F 17/30 | (2006.01) |
| G06F 16/2457 | (2019.01) |
| G06F 16/248 | (2019.01) |
| G06F 16/33 | (2019.01) |
| G06F 16/338 | (2019.01) |

(Continued)

(52) U.S. Cl.
CPC .......... *G06F 16/24578* (2019.01); *G06F 7/08* (2013.01); *G06F 7/24* (2013.01); *G06F 16/248* (2019.01); *G06F 16/2457* (2019.01); *G06F 16/2471* (2019.01); *G06F 16/24522* (2019.01); *G06F 16/24575* (2019.01); *G06F 16/334* (2019.01); *G06F 16/338* (2019.01);

(Continued)

(58) Field of Classification Search
CPC ........ G06F 16/13; G06F 16/24; G06F 16/156; G06N 3/00; G06N 5/00; G06B 13/00
See application file for complete search history.

(56) References Cited

U.S. PATENT DOCUMENTS 6,292,796 B1 * 9/2001 Drucker ............ G06F 17/30699
6,487,553 B1 * 11/2002 Emens .............. G06F 17/30864
(Continued)

OTHER PUBLICATIONS

Frank et al: "Question answering from structured knowledge sources," Journal of Applied Logic, Jan. 17, 2007, 5(1):20-48.
(Continued)

*Primary Examiner* — Hung D Le
(74) *Attorney, Agent, or Firm* — Fish & Richardson P.C.

(57) ABSTRACT

In general, the subject matter described in this disclosure can be embodied in methods, systems, and program products for receiving, by a computing system, a query that was specified by user input at a computing device. The computing system identifies one or more results to the query. The computing system provides the one or more results for presentation by the computing device. The computing system receives an indication that user input at the computing device provided input to save a user-selected result, of the one or more results, for later presentation. The computing system receives a request to present the computing device with a display of saved results to search queries. The computing device presents the display of saved results to search queries, including a presentation of the user-selected result and a second user-selected result.

15 Claims, 34 Drawing Sheets

(51) Int. Cl.
  *G06F 16/2458* (2019.01)
  *G06F 16/9535* (2019.01)
  *G06F 16/9032* (2019.01)
  *G06F 16/332* (2019.01)
  *G06F 16/2452* (2019.01)
  *G06N 5/00* (2006.01)
  *G06F 7/08* (2006.01)
  *G06F 7/24* (2006.01)

(52) U.S. Cl.
  CPC .... *G06F 16/3329* (2019.01); *G06F 16/90328* (2019.01); *G06F 16/9535* (2019.01); *G06N 5/00* (2013.01)

(56) References Cited

U.S. PATENT DOCUMENTS

| | | | | |
|---|---|---|---|---|
| 8,423,541 | B1* | 4/2013 | Baluja | G06F 17/30867 |
| | | | | 707/732 |
| 8,487,553 | B2* | 7/2013 | Saito | G03B 21/2026 |
| | | | | 315/308 |
| 2001/0014910 | A1* | 8/2001 | Bobo, II | H04N 1/32106 |
| | | | | 709/206 |
| 2005/0216443 | A1* | 9/2005 | Morton | G06F 16/447 |
| 2007/0050386 | A1* | 3/2007 | Busey | G06F 16/86 |
| 2007/0198500 | A1* | 8/2007 | Lucovsky | G06F 16/951 |
| 2008/0243799 | A1* | 10/2008 | Rozich | G06F 3/0484 |
| 2009/0055355 | A1* | 2/2009 | Brunner | G06Q 30/02 |
| 2014/0040244 | A1* | 2/2014 | Rubinstein | G06F 16/248 |
| | | | | 707/722 |
| 2014/0280087 | A1* | 9/2014 | Isensee | G06F 16/3329 |
| | | | | 707/723 |
| 2014/0324829 | A1* | 10/2014 | Hanses | G06F 16/9562 |
| | | | | 707/722 |
| 2015/0142778 | A1* | 5/2015 | Bilinski | G06F 16/3349 |
| | | | | 707/722 |
| 2015/0242495 | A1* | 8/2015 | Goldstein | G06F 16/9535 |
| | | | | 707/706 |
| 2016/0085761 | A1* | 3/2016 | Ellis | G06F 16/951 |
| | | | | 707/729 |
| 2016/0188742 | A1* | 6/2016 | Ingvoldstad | G06F 16/9562 |
| | | | | 707/722 |
| 2017/0235732 | A1* | 8/2017 | Williams | G06F 16/9566 |
| | | | | 707/723 |

OTHER PUBLICATIONS

Günter Neumann et al: "A Cross-Language Question/Answering-System for German and English," In: "Network and Parallel Computing", Jan. 1, 2004, Springer International Publishing, Cham 032548, 3237:559-571.

International Search Report and Written Opinion for International Application No. PCT/US2017/017839, dated Apr. 19, 2017, 19 pages.

Extended European Search Report in European Application No. 20209185.6, dated Mar. 18, 2021, 11 pages.

Wikipedia.com [online], "Access-control list," Wikipedia, dated Apr. 9, 2016, URL <https://en.wikipedia.org/w/index.php?title=Access-control_list&oldid=714412886>, 3 pages.

* cited by examiner

NAVIGATION

- Home
- Projects — 1702
- Audience
- Train RnR ranker
- Manage Companies
- Manage Alchemy jobs
- Archetypes
- Add Data
- About
- Help

Audience

YOU ARE HERE  Home > Targets

NEW TARGET ⊕ — 1712

MY TARGETS

| TARGET — 1704 | PROJECT — 1706 | Asc / Desc | EDIT | DELETE |
|---|---|---|---|---|
| Good Morning America - US | Good Morning America | Apr 12, 2016 | ✎ | ⊗ |
| Walking Dead | Walking Dead | Mar 31, 2016 | ✎ | ⊗ |
| Daredevil | Netflix | Mar 31, 2016 | ✎ | ⊗ |
| Greys Anatomy | ⊕ | | | |

VIEW MORE

COMPANY TARGETS

| TARGET — 1708 | PROJECT — 1710 | Asc / Desc | EDIT |
|---|---|---|---|
| Good Morning America - US | Good Morning America | Apr 12, 2016 | ✎ |
| Walking Dead | Walking Dead | Mar 31, 2016 | ✎ |
| Daredevil | Netflix | Mar 31, 2016 | ✎ |
| Greys Anatomy | | | |

VIEW MORE

TARGET ARCHETYPES

| | | |
|---|---|---|
| 12.3% ⊙ The Rebel | 11.8% ⊙ The Jester | The Citizen |
| 4.5% ⊙ The Nurturer | 2.7% ⊙ The Citizen | AKA The Citizen |
| 0.7% ⊙ The Lover | 15.6% ⊙ The Magician | DESCRIPTION The citizen is your next door neighbor. A good, solid, self-aware, middle-class, tax-paying member of society. Grass roots, down to earth☺?? and proud of it! |
| 6.9% ⊙ The Innocent | 4.0% ⊙ The Explorer | TYPE & ORIENTATION ego |
| 0.0% ⊙ The Ruler | 0.9% ⊙ The Hero | CELEBRITIES Tom Hanks |
| 0.2% ⊙ The Sage | 2.7% ⊙ The Creator | |

SOCIAL RESULTS — 2102

Carmindy CarmindyBeauty
Beauty Dream Team @goodmorningamerica @grettamonthan #BridesGoneStyled @tedgibsonbeauty @jasonbacke http://t.co/aVcXDye9q2

Joe Duffy Jo3Dutty
On @nickiminaj #nickigma #goodmorningamerica https://t.co/VSfenFPCqJ

Danni ★★★★
Breakfast and #GoodMorning America at their new kid table! No more coffee table being used as a kids? https://t.co/AtendN5q

Garrett Steede ★★★★★
GOODBYE to these two football players! The one with the mullet is as dumb as a box of hair! #GoodmorningAmerica

MEDIA MIX

MEDIA SHARE — 2104  DIGITAL DISPLAY — 2106

MAGAZINES 11.4%
2.7%
NEWSPAPERS
DIGITAL SOCIAL 7.9%
Others
68.2%

DIGITAL SEARCH
183.973 | 68.2%
DIGITAL SEARCH

Openness, Centiousness, Extraversion, Agreeableness, Neurotics — 2108

FIG. 22

Searching System searchingsystem.com/html/target.jsp?tid=449&name=Good%20Morning%20America%20-%20US Ask Searching System....  [Go!]

nabdemo

NAVIGATION
- Home
- Projects
- Audience
- Train RnR ranker
- Manage Companies
- Manage Alchemy jobs
- Archetypes
- Add Data
- About
- Help Good Morning America - US YOU ARE HERE   Home > Target

[Select Target]

| DASHBOARD | ARCHETYPE | SOCIAL RESULTS | CHANNEL ALLOCATION |

TARGET ARCHETYPES

| 12.3% | The Rebel | 11.6% | The Jester |
| 4.5% | The Nurturer | 2.7% | The Citizen |
| 0.7% | The Lover | 15.6% | The Magician |
| 6.9% | The Innocent | 4.0% | The Explorer |
| 0.0% | The Ruler | 0.9% | The Hero |
| 0.2% | The Sage | 2.7% | The Creator |

The Nurturer
AKA The Nurturer
DESCRIPTION The Nurturer is all about helping others??? healing, helping, comforting. She derives her sense of self and purpose from her mission of others.
TYPE & ORIENTATION ego
CELEBRITIES Angelina Jolie

PROFILE 2310

Your target group looks like the following 2312

Personality
- Openness ~ 2314
- Conscientiousness ~
- Extraversion ~
- Agreeableness ~
- Emotional range ~

Customer Needs
- Challenge
- Closeness
- Curiosity
- Excitement
- Harmony

Values
- Conservation
- Openness to change
- Hedonism
- Self-enhancement
- Self-transcendence Show more

| Best Candidates (6/6) | | | | |
|---|---|---|---|---|
| Action | Candidates | COST | ESTIMATED IMPRESSIONS | OPENNESS | CONSCIENTIOUSNESS |
| +ADD | AORN INC; | 1,769 | 0.000 | 0.393 | 0.128 |
| +ADD | DRIZLY | 13,072 | 0.000 | 1.000 | 0.970 |
| +ADD | ECONOMIST.COM | 4,485 | 0.000 | 0.996 | 0.126 |
| +ADD | INSTITUTIONAL INVEST | 18,752 | 0.000 | 0.831 | 0.039 |
| +ADD | LOS ANGELES TIMES | 9,087 | 0.000 | 0.763 | 0.056 |
| +ADD | MEREDITH INTERACTIVE | 72,201 | 0.000 | 0.853 | 0.099 |

COMPILING RESULTS FROM DIFFERENT SEARCH QUERIES

CLAIM OF PRIORITY

This application claims priority to U.S. Patent Application Ser. No. 62/335,812, filed on May 13, 2016, the entire contents of which are hereby incorporated by reference.

TECHNICAL FIELD

This document generally relates to compiling results from different search queries.

BACKGROUND

Search engines enable users to search for information on the Internet. In response to a user providing a query at a client device, the client device typically sends the query to a search engine, and the search engine identifies a collection of results that are responsive to the search query from a corpus of potential results. The search engine can provide the list of results back to the client device for display.

A user of the client device may view the list of displayed results, and may select one of the results. Selection may cause the client device to present additional information that is relevant to the selected result, for example, another web page that includes data for which the selected result presented a summary.

SUMMARY

This document describes techniques, methods, systems, and other mechanisms for compiling results from different search queries.

Particular implementations can, in certain instances, realize one or more of the following advantages. A computing system can determine whether to respond to a query using one or more structured datasets or one or more unstructured datasets. When querying the structured datasets, the computing system may determine which of the multiple structured datasets to query based on pre-determined preferences, so that a most-relevant result is to be selected. Moreover, the presentation of results that are relevant to the query can be customized based on a type of the result and a confidence score for the result. This customization can include the computing system selectively expanding certain search results and providing alternative queries in response to a search.

The details of one or more implementations are set forth in the accompanying drawings and the description below. Other features, objects, and advantages will be apparent from the description and drawings, and from the claims.

DESCRIPTION OF DRAWINGS

FIGS. 2A-B show a user interface for submitting a query.

FIG. 6 shows a webpage that includes a list of results to a query of unstructured data, in which the highest-ranking result has a confidence score that exceeds a threshold and is expanded.

FIG. 7 shows a webpage that includes a list of results to an unstructured query, in which the highest-ranking result has a confidence score that does not exceed a threshold and is collapsed.

FIG. 10 shows a webpage that includes a result to a query of a structured dataset, in which the highest-ranking result has a confidence score that does not exceeds a threshold and is shown with suggested queries.

FIG. 12 shows a web page at which a user can select a project to which to save a result.

FIG. 13 shows a web page at which a user can select a project for which to view one or more saved results.

FIG. 17 shows a web page that lists multiple targets.

Figure 19:
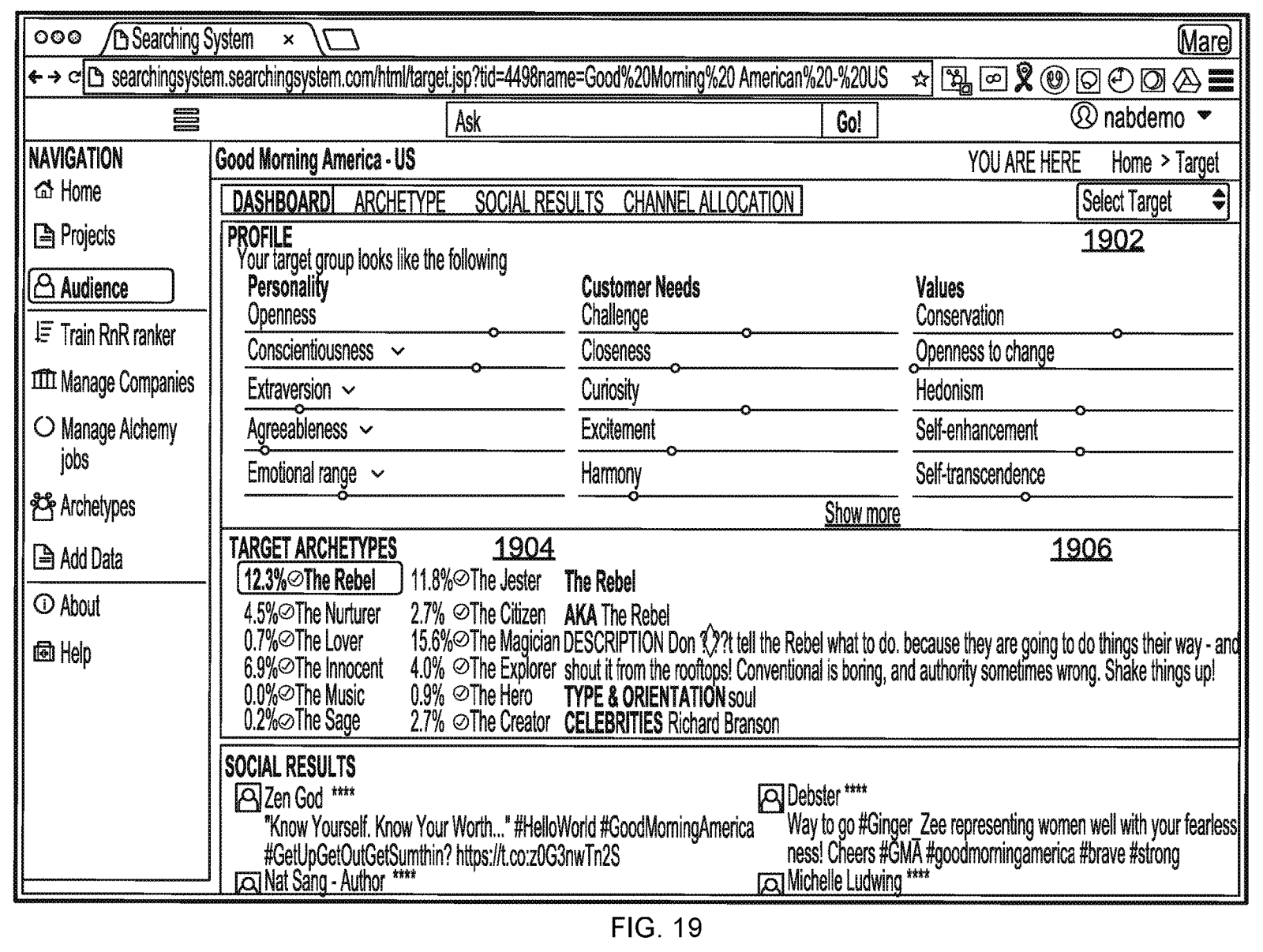

FIG. 19 shows a web page that indicates values for personality characteristics.

FIG. 21 shows a web page at which a user can specify characteristics for an archetype that the user selected.

FIG. 22 shows another example of the web page that was shown in FIG. 19, but for a different target and scrolled to the bottom of the page.

FIG. 23 shows an Archetype tab for the Audience portion of the web page.

FIG. 24 shows a Social Results tab for the Audience portion of the web page.

FIG. 27 shows a web page that is presented when a user selects a table user interface element.

DETAILED DESCRIPTION

This document describes compiling results from different search queries.

Users of traditional search systems can have difficulty obtaining results that the user considers helpful and relevant to the query that the user submitted. Some systems may be configured to search data that is stored in a structured manner, such that the searching system can obtain a specific answer for a query (e.g., in database tables that are structured according to administrator preferences, that store the results in fields of the database table, and in which a result is selected based on it being located in a particular field that is responsive to a query, possibly to the exclusion of any consideration of a content of the fields). For example, a query that requests the circumference of the earth may return a single-phrase answer that was stored in a field of a database table (e.g., the answer "24,901 miles"). While these types of search systems are powerful when the user submits a query that has a known answer that is identifiable due to is location in the structured data set, a weakness in such search systems is exposed when a user asks a question for which the structured dataset does not have an answer.

Systems that search unstructured data, on the other hand, can provide one or more results when there is no specifically-identifiable answer. Still, the list of results may not provide the same apparent confidence as a result to a query of a structured dataset, because the list may not present a single answer to the query. The unstructured data may include representations of thousands or millions of documents, and the search may identify multiple of those documents that the searching system determines to be relevant to the query, rather than the content of a field in a database table, as may occur with searches of structured datasets.

The systems described in this document can receive a query and provide one or more answers to the query by searching one or both of these datasets (structured and unstructured). In effect, the system may determine which type of search is more likely to yield the best one or more results, and may execute that determined type of search. The operations of this system and variations thereof are described with reference to various system diagrams, flow-charts, and user interface displays, as follows.

Figure 1:
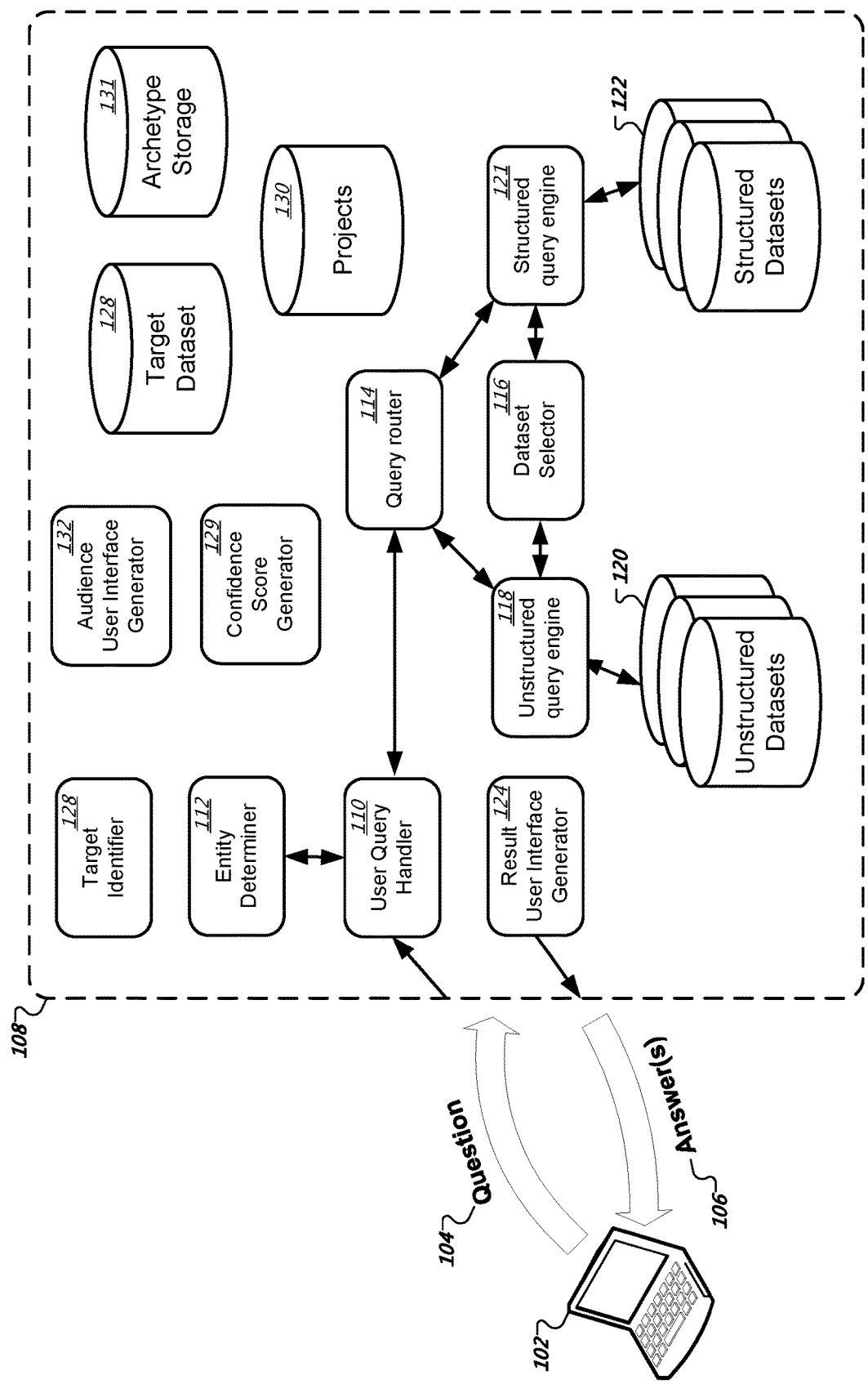
FIG. 1 shows a system for searching structured and unstructured data.

FIG. 1 shows a system for searching structured and unstructured data. The system includes a computing device 102 at which a user specifies a query 104 (also referred to herein as a question 104) that is transmitted to a remote computing system 108. The computing system 108 may include multiple components and data sets that it uses to identify one or more responses 106 to the query (also referred to herein as one or more answers 106). The responses may be provided to the computing device 102 for display. The process for performing this type of a search, and the components that are involved in performing the search, are described in additional detail with reference to the following figures.

Figure 2A:
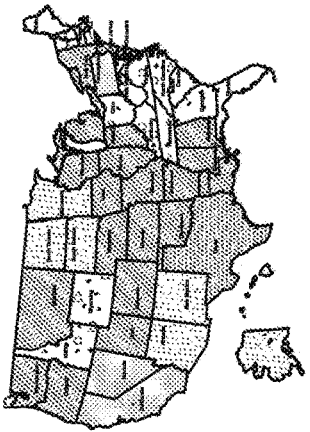
Figure 2B:
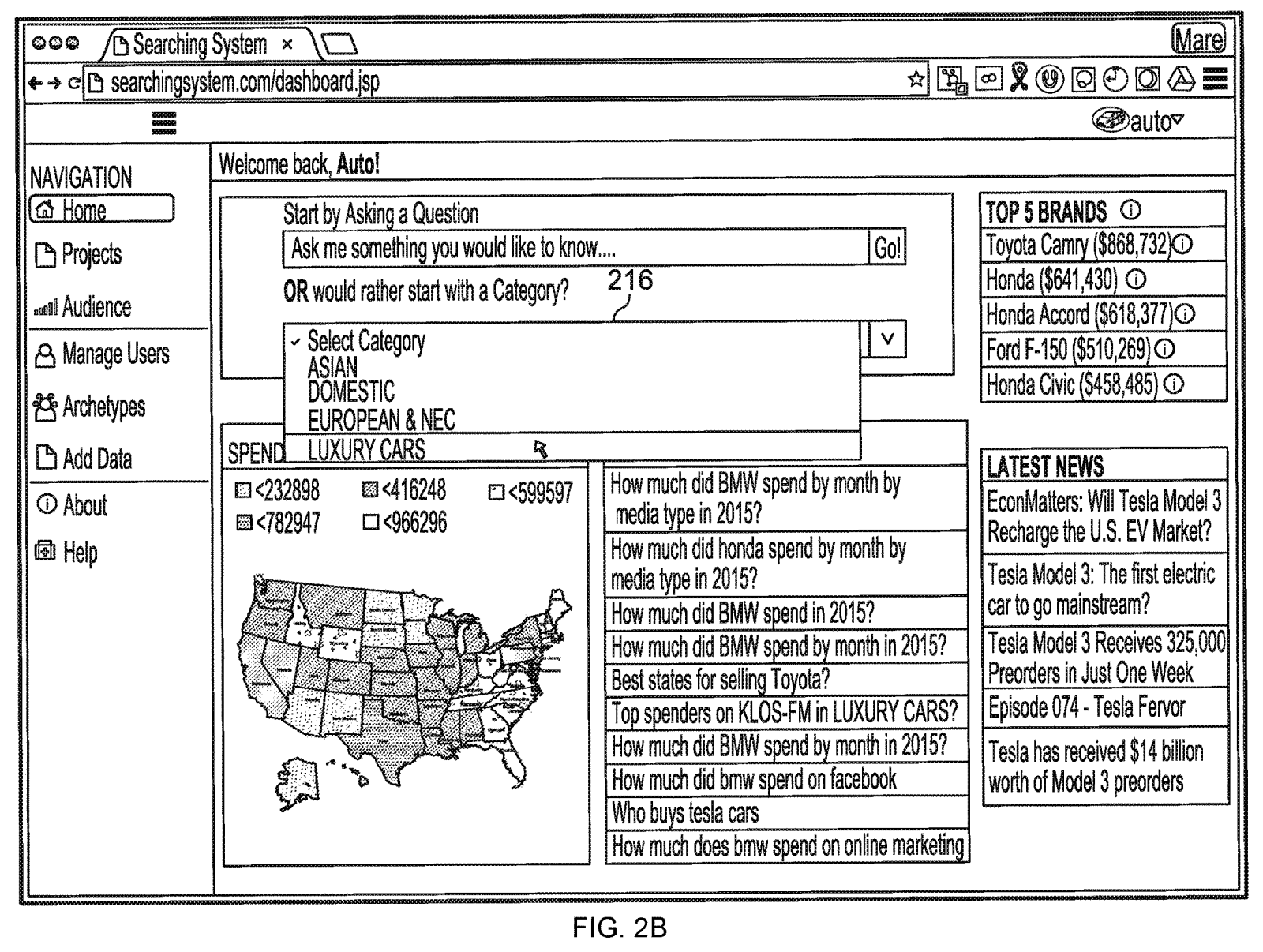

FIGS. 2A-B show a user interface for submitting a query. In this example, the user interface is provided by a web browser as the welcome or "Home" page of a searching website. This web page may include various aspects that allow users to enter queries and search content accessible to the searching website. For example, the page may include a text entry box 210, into which a user can type a search query (e.g., by selecting the text entry box 210 with a mouse cursor or by touchscreen selection, and then typing a query into text entry box 210 with a physical or virtual keyboard). A user may request that the computing system perform a search using the typed search query as an input by selecting the "enter" key on a keyboard or by selecting the "Go!" user interface element 212.

In this example, the user interface shows that a user "auto" 216 has already logged into the website. A user may log into the website by typing a URL for a web address of the searching website into a web browser address bar (or selecting a bookmark), to navigate to a login page. At the login page, the user may enter a username and a password. The system may determine whether the username is valid, and whether the password is correct for the entered username. If so, the system may log the client device (e.g., a browsing session of the web browser) into the user account. Once logged in, the user experience and the web pages that are provided for display to the user may be customized based on preferences stored for the user account. In various examples, the searching system may provide multiple organizations access to the searching website, and each organization may have a customized experience through use of the searching website (e.g., with different saved lists of projects and different databases available to users of each organization). Each organization may be associated with multiple user accounts, and therefore the user account under which a person logs in may affect the user experience provided to the person while viewing the searching web site.

The user interface includes other components, such as a sidebar 220 that includes user interface elements that user input can select to navigate to different pages of the website. As indicated by the highlighting, the website is currently displaying the "Home" page.

This "Home" page provides additional features beyond just offering an ability to run a search. For example, the web page may include a list of questions 240 that other members of the team have provided. These may be questions that other individuals have previously specified through use of text entry box 210, when those other individuals were logged into the website under other user accounts assigned to a same organization. (Users logging into user accounts for a different organization would see a different list of questions, such as those that were entered by users of that different organization.) In response to selection of a suggested question, the client device's web browser may navigate to a display of one or more search results for the question, just as if the question was typed into the text entry box 210 and a user selected the "Go!" button.

The web page also includes a widget 230 that shows graphical data on marketing dollars spent for each state, a widget 250 that shows the top five automobile brands, and a widget 260 that includes links to recent news articles.

Underneath the text entry box 210 is a user interface element 214 for selecting a category within which to search. In response to user selection of this interface element 214, the web page presents a pull down list 216 of user-selectable categories. In this example, the user selects the "Luxury Cars" category, and the web page changes to that shown in FIGS. 3A-B, which show a web page for entering a category-specific query.

Figure 3A:
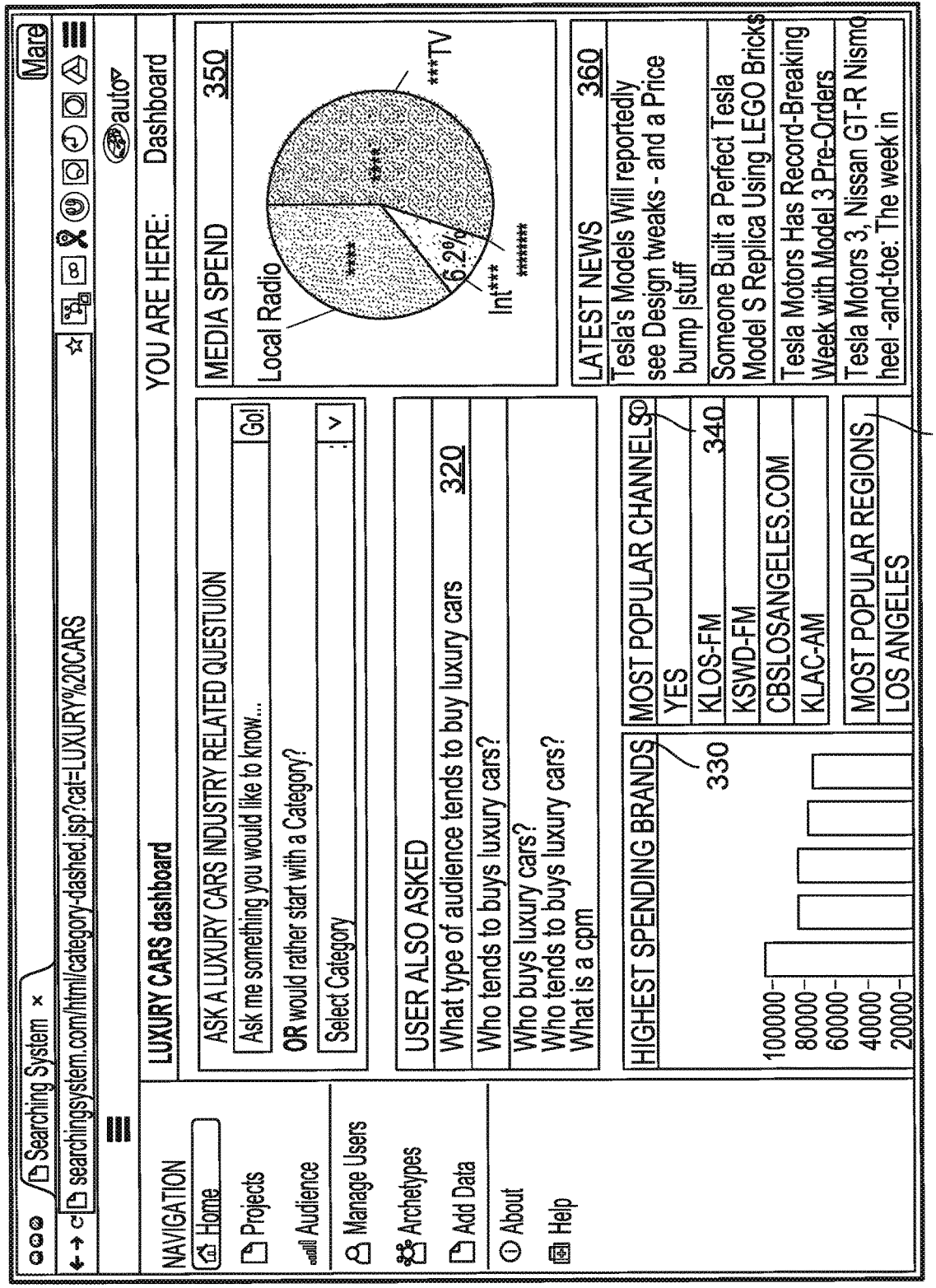
FIGS. 3A-B show a user interface for submitting a category-specific query.
Figure 3B:
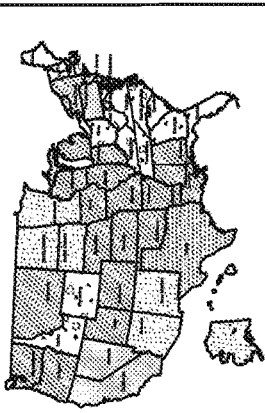

Note that in FIGS. 3A-B, the user interface has changed from that shown in FIGS. 2A-B (either through navigation to another web page or dynamic updating of the web page). The updated user interface indicates that the display is now of a "Luxury Cars dashboard" and prompts the user to "Ask a Luxury Cars Industry Related Question." In this example, should the user ask a category-specific question, only a subset of datasets (or documents within one or more datasets) may be queried to answer the question.

The category-specific web page includes multiple widgets that show data related to the category, such as a list of questions 320 that were previously asked by someone using that same user account while in the luxury cars dashboard. The web page also includes a pie graph 350 that shows the distribution of media spend within the luxury car industry, a bar graph 330 of the highest-spending brands within the industry (this bar graph may be a result that the computing system would provide should a user enter a natural language query into the text search box, such as "What are the highest-spenders for luxury automobiles"), a list 340 of the most-popular channels (e.g., outlets or publications through which media can be distributed) for the luxury car market, a widget 360 showing the latest news for the luxury car industry, a list 370 of the most popular regions for luxury cars, a depiction 380 of the top markets for luxury cars, and a list 390 of user-selectable questions of for similar categories.

Figure 4:
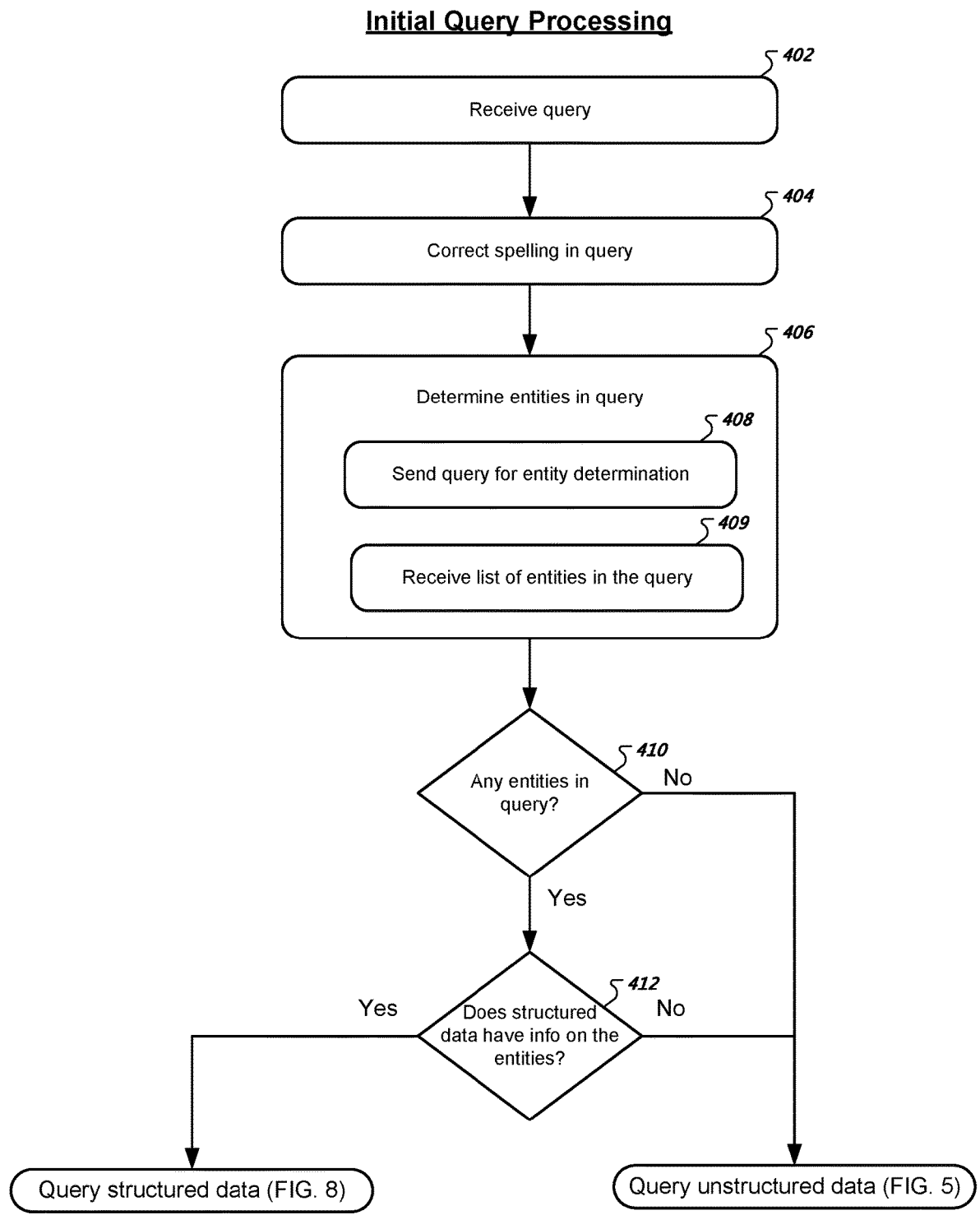
FIG. 4 shows a flowchart of initial actions for processing a query.

FIG. 4 shows a flowchart of initial actions for processing a query. For example, this flowchart may describe operations that the computing system 108 performs as a result of a user entering a query in the text search box 210 that is shown in FIG. 2A.

At box 402, the computing system receives a query. For example, the computing system 108 (FIG. 1) receives a query 104 that was specified by user input at computing device 102. The user may have specified the query 104 at the computing device 110 by typing the query into the text search box 210. In some examples, the user speaks the query and voice recognition processes at the computing device 102 or the computing system 108 convert the spoken query into text.

At box 404, the computing system corrects spelling in the query. For example, the user query handler 110 may perform spell-checking and spell-correction operations on the query, or may request that a separate process perform the same. The user query handler 110 may also perform or request that the query is processed by a natural language processor that restructures the query (e.g., by changing the sentence format to a standard or alternative format). The user query handler 110 may also perform other operations on the query, for example, by identifying synonyms to words in the query and adding those words to the query. Although the query may have been restructured and changed in various ways, this disclosure will still refer to the changed text as the query.

At box 406, the computing system determines any one or more entities in the query. In some examples, this involves sending the query (e.g., that which has been changed through natural language processing) to an entity determiner 112 (box 408) and receiving from the entity determiner 112 a list of entities in the query (box 409). The entity determiner 112 may analyze the query to determine whether the query includes words or phrases that are identified as entities. Entities may refer to persons, places, or things (e.g. nouns from a list of pre-determined nouns).

At boxes 410 and 412, the computing system (e.g., the query router 114) determines whether to use the query to interrogate one or more structured datasets or one or more unstructured datasets. In other words, the computing system identifies whether the one or more datasets of structured data include data for answering the query. This decision process is illustrated in FIG. 4 as two operations (i.e., those of boxes 410 and 412), but those operations could be combined into fewer operations.

The determination may involve determining whether the query includes one or more entities for which one or more structured datasets may have information. For example, a structured dataset may include sales data on various automobiles for various states and in various years. The automobiles may include "Subaru Outback" and "Honda Accord," the states may include all fifty states, and the years may include 2010-2015 for Subaru Outback and 2002-2015 for Honda Accord. Accordingly, the structured dataset may store this data in a multi-dimensional format (with each dimension, such as "car types," "years," and "states" including multiple members). Because a dataset may include a "car types" dimension that has "Honda Accord" as a member, should the entity determiner 112 determine that the query includes the phrase "Honda Accord," then the computing system may use the query to interrogate the structured dataset that includes the dimension with "Honda Accord" as a member. Should "Honda Accord" be the only identified entity in the query, and should there be no dataset that includes a "Honda Accord" member, then the query may be routed for interrogation of the unstructured datasets rather than a structured dataset. These operations are described in additional detail with reference to boxes 410 and 412.

At box 410, the computing system determines whether the query was determined to include any entities. For example, the query router 114 may determine whether the entity determiner 112 identified at least one entity in the query. If not, the query router 114 may route the query for processing of unstructured data. If the query was identified as including at least one entity, the query router 114 may then determine whether any of the structured datasets store information for the identified one or more entities. Continuing with the above illustration, the computing system may determine whether any of the structured datasets include a "Honda Accord" member (sometimes referred to as an "attribute" in various database or data storage systems or nomenclatures). If the answer is yes, then the query router 114 may route the query for processing of structured data. If the answer is no, then the query router 114 may route the query for processing of unstructured data. In examples in which the query includes multiple entities, but only some of them have corresponding data in a structured dataset, the query may be provided for processing of the structured data, but the database query that is created (as described below, with reference to FIG. 5), may only refer to entities for which there is data in the structured dataset (e.g., for which there is a member or attribute assigned to the name of the entity).

Figure 5:
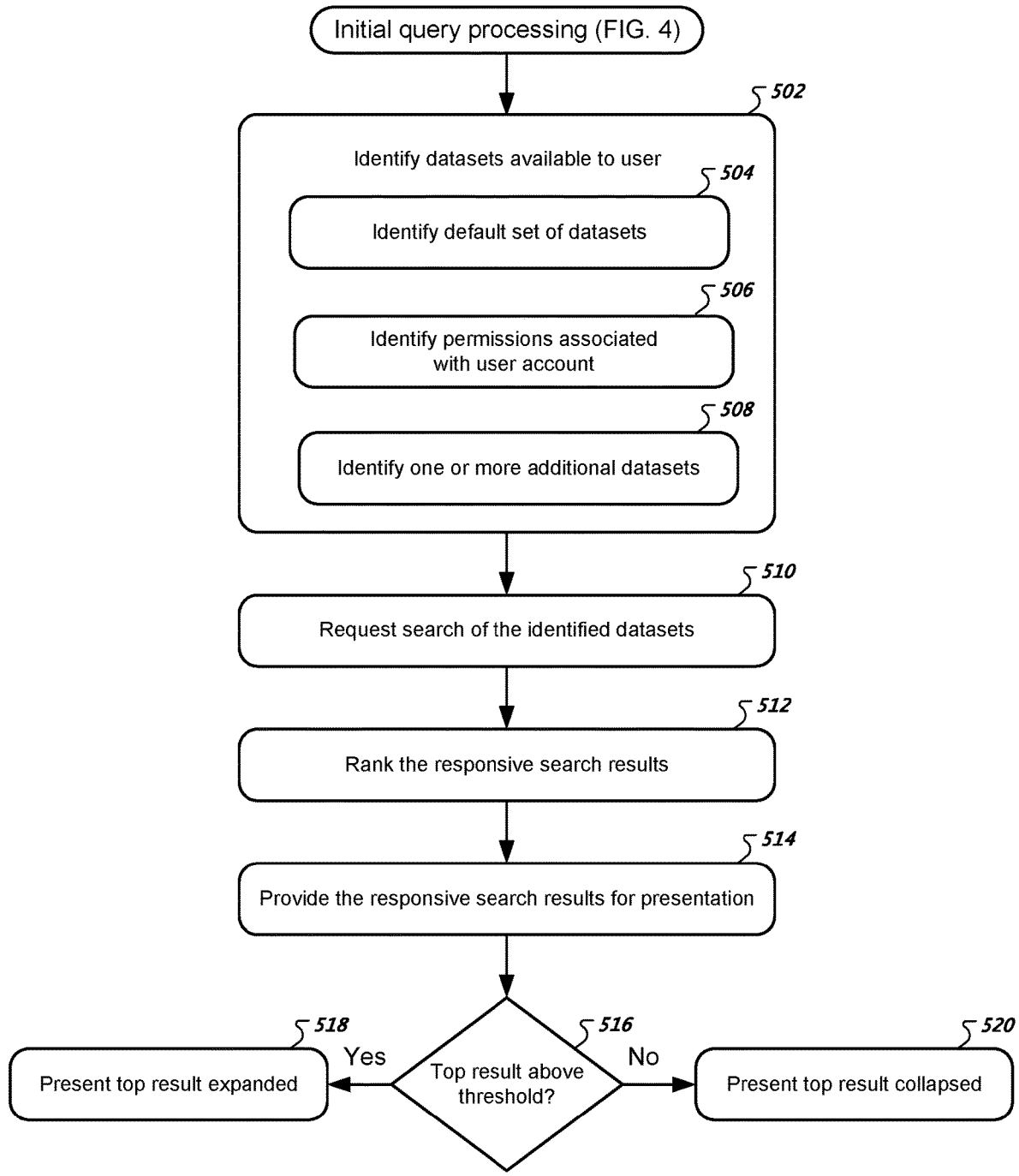
FIG. 5 shows a flowchart of actions for processing a query of unstructured data.

FIG. 5 shows a flowchart of the actions for processing a query of unstructured data. These actions may be performed in response to the computing system determining that the query should be run on one or more unstructured datasets, as described with respect to FIG. 4.

At box 502, the computing system (e.g., the dataset selector 116) identifies a subset of datasets that are available for querying. The identification may be performed because the computing system may include or be in communication with some datasets that should only be accessible to certain user accounts (e.g., user accounts affiliated with an organization that provided the dataset or an organization that paid a license to access the dataset).

At box 504, the identification of available datasets includes identifying a default set of datasets. These may be those datasets that are designated as being available to all user accounts, regardless of the organization to which the user account is assigned. One example default unstructured dataset may include data retrieved from WIKIPEDIA through an automated collection process (e.g., through use of a web crawler). Another example default unstructured dataset may include data pulled from a social network such as TWITTER (e.g., through use of an API). An example of a default structured dataset is data from BLUE SKY DATA CORPORATION.

At box 506, the identification of available datasets includes identifying permissions that are associated with a user account into which the computing device 102 was logged and for which the website customized the web page that presented text entry box 210. As previously described, the user account may be assigned to a single organization (e.g., employer of the user) or group of user accounts. Each user account may be only assignable to a single organization or a single group of user accounts. As such, the permissions may be those assigned specifically to the user account, or those that are associated with the user account by way of them being assigned to the organization or group of which the user account is a member.

In some examples, the permissions may indicate that the organization or a group of which the user account is a member has paid a license to access a particular dataset. For example, the user account may be for an employee of a particular organization, and that particular organization may have paid a license fee to another company that is different from an organization that runs the searching system. In other words, the searching system may be able to access licensed data, but may only be able to run searches on the licensed data for customers that have paid the appropriate licensing fee.

Access to the licensed datasets can be requested or authenticated in various ways. In some examples, an administrator of the particular organization can enter login credentials (e.g., a username and password) to login to an interface that is provided by the provider of the licensed data (e.g., either through a web page of the provider of the licensed data or a web page of the searching system that provides a widget or login system on behalf of the provider of the licensed data). Once authenticated, the computing system of the provider of the licensed data may provide, to the administrator or the searching system, an indication (e.g., a token) that users of the particular organization can utilize to access the licensed data. This indication may be the above-described permission, or may be used to set the above-described permission.

In some examples, the permissions (e.g., a portion thereof) may indicate that the organization or group of which the user account is a member has provided the data in a particular dataset, and thus that the user account is able to access that data. As an illustration, some companies may have data that would be particularly relevant to some queries, and may want that data to be included in search results if relevant. One such example may be a car company that wants to be able to search sales data for all car brands from publicly-available or licensed sources of data, but which would also like its own confidential sales data to be searched—yet only when searches are performed by employees of the car company.

In such an example, the computing system 108 would include an interface through which a remote computing device authenticated for a particular user account or group of user accounts could upload data to the computing system. The uploaded data could be accompanied by a request that the uploaded data only be available to a specified group of user accounts. In other examples, the interface would allow the remote computing device to specify a location at which data was stored remote from the computing system (e.g., along with credentials or a token to access the data).

At box 508, the identification of the available datasets includes identifying one or more additional datasets. These one or more datasets may be those datasets that the permissions that are associated with the user account indicate as being available for a search. As such, a portion of the one or more additional datasets may include one or more licensed datasets, while another portion of the one or more additional datasets may include one or more employer-provided datasets.

The default and additional datasets may be just the unstructured datasets that are available to the user, just the structured datasets that are available to the user, or both, depending on whether the query was routed for unstructured querying, or structured querying, or both. (In the flowchart of FIG. 5, the query was routed for unstructured dataset processing, but the same or similar operations may occur to identify datasets specific to structured dataset processing, as described with reference to box 802 in FIG. 8.)

At box 510, the computing system requests a search of the identified datasets. For example, the unstructured query engine 118 may request a search of a subset of the unstructured datasets 120 that were selected by the dataset selector 116. Those searched datasets may include the one or more default datasets and the one or more datasets that were identified based on permissions. The search may be performed by the computing system 108 or may involve the computing system 108 requesting that a remote system performs the search and provide an indication of the responsive results to the computing system 108.

In this example, the unstructured datasets include datasets in which the entire content of a resource (e.g., a web page or an article) may be queried to determine whether the resource is relevant to the query and should be identified as being responsive to the query. The determination of whether a resource is relevant may involve determining a frequency with which words in the query (e.g., the entities) appear in the resource. Although the resources may be referenced by different database fields, this determination may be in distinction to operation of a query of a structured dataset, in which a result may be retrieved not based on a content of the result itself, but based on the result being located in a field in a dataset that is assigned to database members/attributes that match certain words in the query (e.g., because the database members/attributes have the same name as words in the query). In other words, a structured result may be retrieved based on its location in a dataset (e.g., the result being located in a field in which the result was identified as residing), whereas structured results may be retrieved based on the result itself matching the query.

At box 512, the computing system identifies a ranking of the search results that are responsive to the query. For example, the computing system may rank the search results or request that another system provide a ranking. The ranking may be based on a confidence score that the computing system identifies for each of the responsive results (e.g., as calculated by the confidence score generator 129). The confidence score may be calculated based on various factors. One factor may be a degree to which the result (or the resource that is identified by the result, when the result is considered a summarized version of the resource and may include a link to the resource) includes words in the query. Another factor may be a degree to which the result has previously been selected by the same user account or other user accounts in response to the same or similar queries. Yet another factor may be whether users selected a user interface element to indicate that the result was helpful or not helpful as a response to the query. The computing system may select a subset of the results with the best confidence scores (e.g., the top twenty results with scores that are highest on a range from 0 to 100, in this example).

At box 514, the computing system provides the responsive search results for presentation. As an example, the computing system may provide, for receipt by the computing device, data (e.g., HTML data and other web resource data) that is configured to cause the computing device to display a list of search results when rendered by a web browser on the computing device. The listed search results may include at least a title and a listing of the confidence score, as described with respect to the user interfaces presented in the next figures.

At box 516, the computing system determines whether the confidence score for the top result (e.g., the result with the highest-rank) is above a threshold value. If that score is above a threshold, the top result may be presented for display in an expanded format (box 518) (e.g., with only with all other results presented in a collapsed format). If that score is below the threshold, the top result may be presented for display in a collapsed format (box 520) (e.g., with all other results presented in a collapsed format). In some implementations, all results that are above the threshold may be presented in the expanded format (e.g., in distinction to only one result being able to be expanded, as discussed above). In some implementations, should the top result fall below an even lower threshold, the system may generate a report that indicates that the query was untrustworthy. That report may be provided for review by employees that support the searching system, to evaluate whether to refine the querying system or the datasets that are queried.

Figure 6:
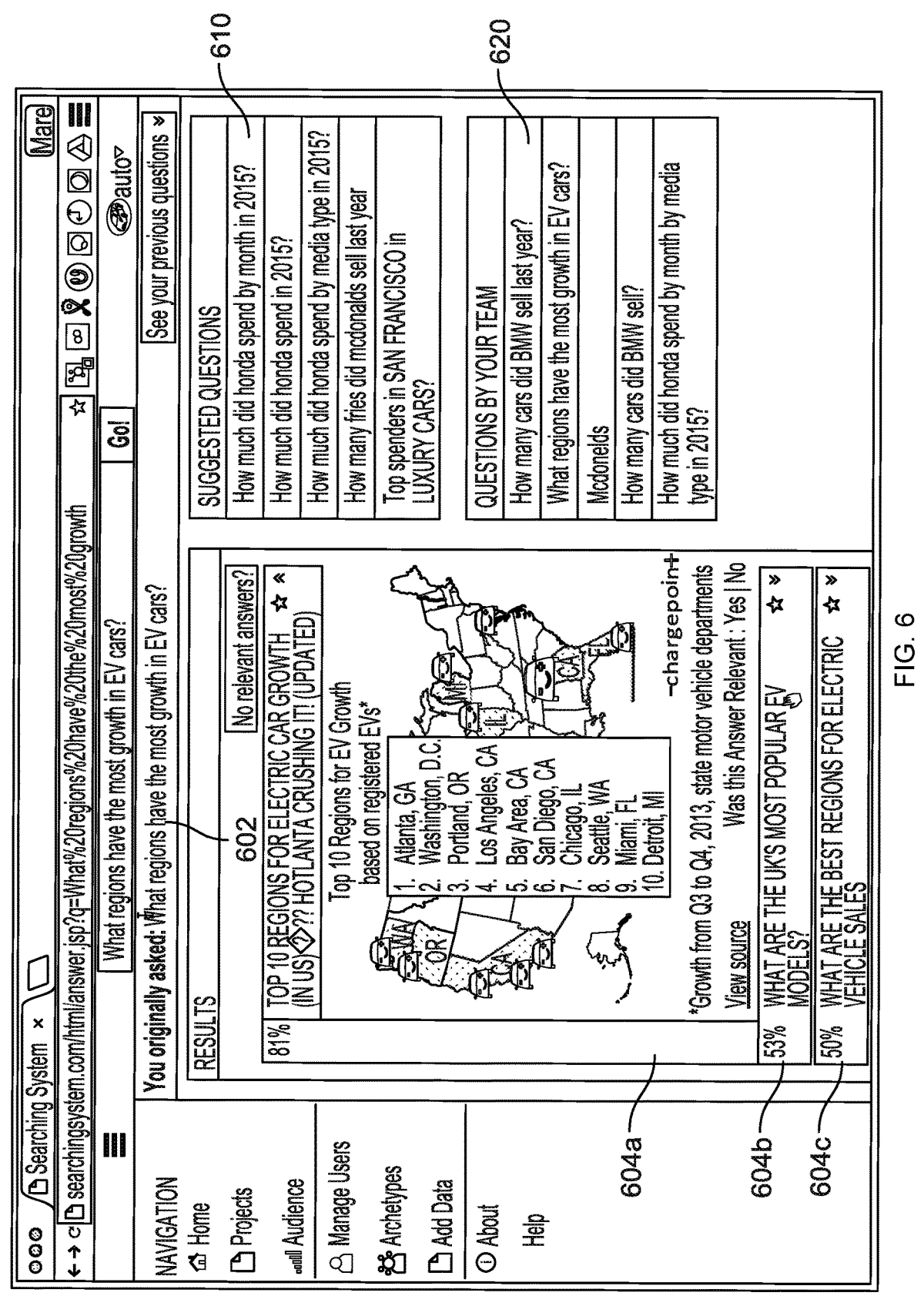

FIG. 6 shows a webpage that includes a list of results to a query of unstructured data, in which the highest-ranking result has a confidence score that exceeds a threshold. In this example, the user typed the query "What regions have the most growth in EV cars?" as illustrated by the header 602 and the text in the text entry box. The computing system 108 may have queried multiple datasets and returned the results 604*a*-*c* that are shown in FIG. 6. Each result includes a title (e.g., "Top 10 regions for electric car growth (in US)" and "What are the UK's most popular EV models?"), a confidence score (e.g., 81% and 53%), a user interface element to save the result (e.g., the "star" in the figures), and a user interface element to expand or collapse the result (shown to the right of the star). In this example, suppose that that the threshold for causing the top result to appear is 75%. As such, since the top result has a confidence score of 81%, the initial presentation of search results shows the top result as expanded, even though the user may not have provided input to expand the search result subsequent to submitting the query.

In this example, the expanded result is a picture that was pulled from a resource that can be viewed by selecting a "view source" link. A user can also indicate whether the result was helpful by selecting the "Yes" or "No" buttons next to the phrase "Was this Answer Relevant?" Selecting "Yes" can cause the computing system to weight the confidence score for the result higher (either generally, for the specific query, or for queries that include the same one or more entities), while selecting "No" can cause the computing system to weight the confidence score for the result lower. The user interface also includes a list of suggested questions 610 and a list of questions by the team 620 that is associated with the logged-in user. The user interface presented by FIG. 6 (and also those of FIGS. 7, 9, and 10, discussed below), can be provided by the result user interface generator 124 (FIG. 1).

Figure 7:
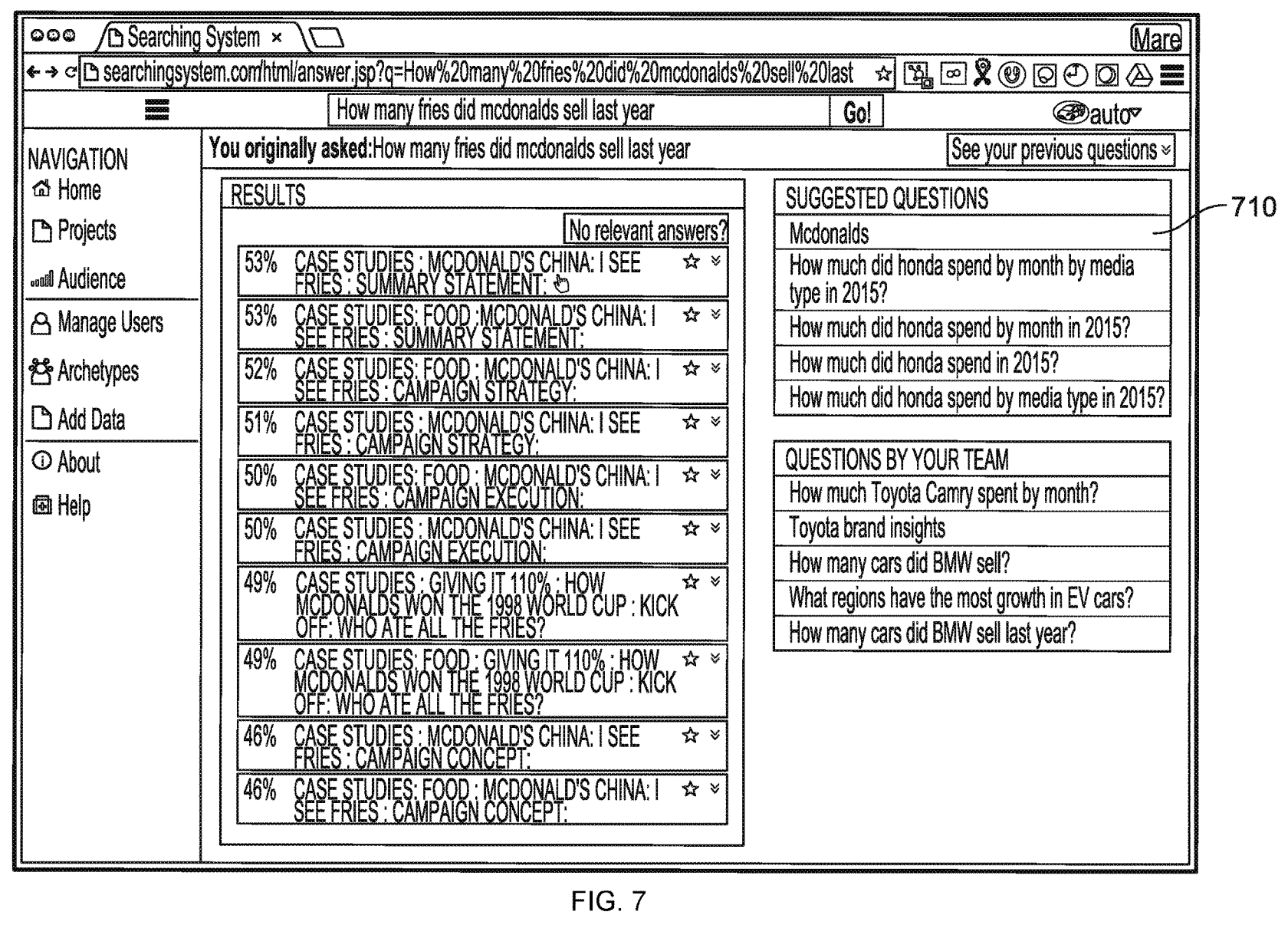

FIG. 7 shows a webpage that includes list of results to an unstructured query, in which the highest-ranking result has a confidence score that does not exceed a threshold. As a result, all of the results are shown in collapsed format, although a user can select the arrow-shaped user interface element at the right of each result to expand the respective result to show additional information pulled from a source of the result, similar to that shown by FIG. 6.

Figure 8:
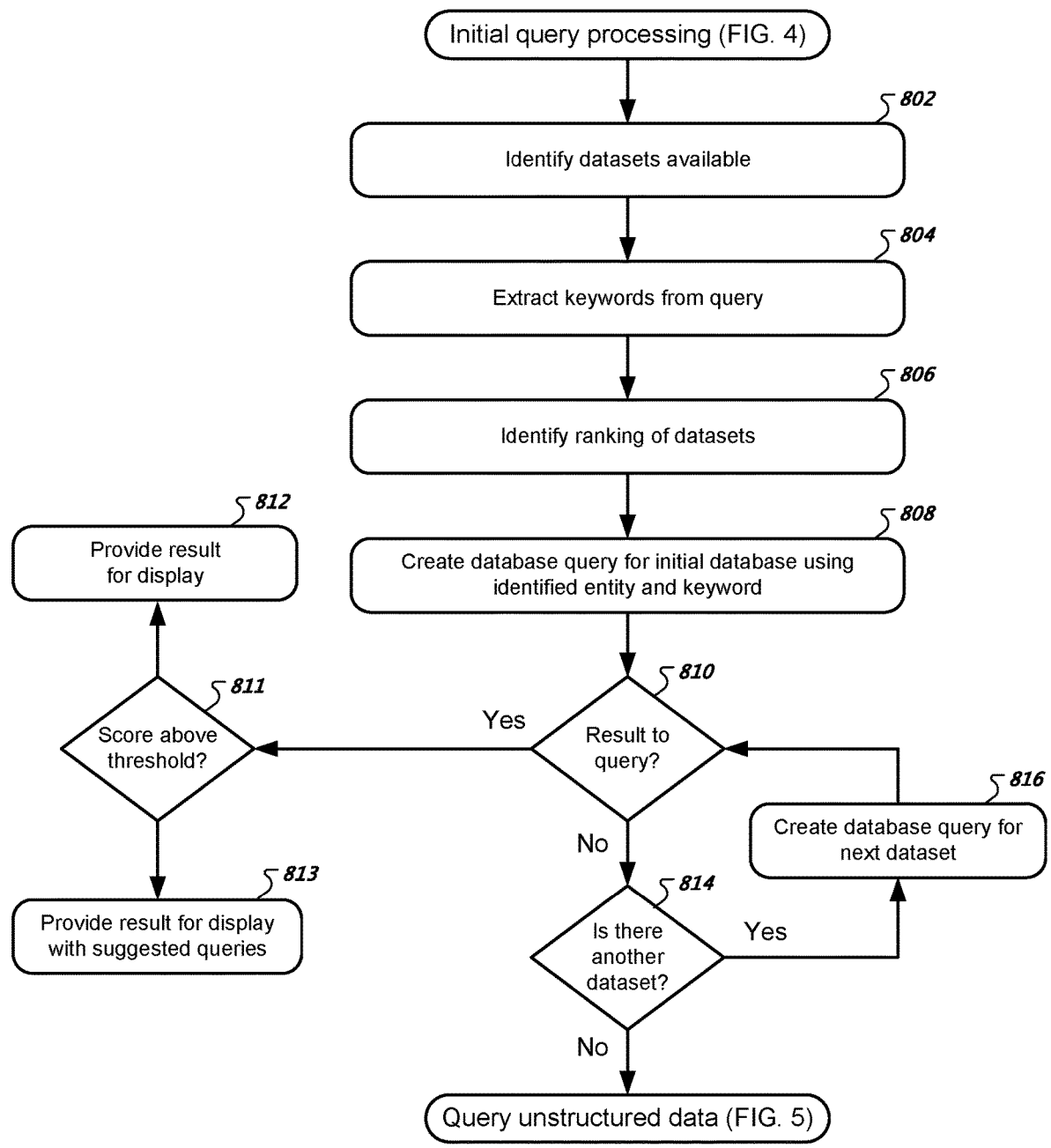
FIG. 8 shows a flowchart of actions for processing a query of structured data.

FIG. 8 shows a flowchart of actions for processing a query of structured data. These actions may be performed in response to the computing system determining that the query should be run on one or more structured datasets, as described with respect to FIG. 4.

At box 802, the computing system (e.g., the dataset selector 116) identifies a subset of datasets that are available for querying. This operation may be the same or similar to that described with respect to box 502 (FIG. 5), but the selection may be of a subset of structured datasets rather than a subset of unstructured datasets. In some examples, the subset of structured datasets is further limited to those datasets that sore information on the one or more entities identified in the query.

At box 804, the computing system extracts keywords from the query. The keyword extraction can include identifying whether the query includes keywords for various pre-designated categories. Such categories may have been defined by an administrator of the searching system and may include, for example, a date or portion thereof (e.g., "2015", "March", "January 5, 2016"). Another category can be a type of media (e.g., "outdoor", "digital", or "television"). Yet another category can be a type of metric of data (e.g., "spend" or "volume").

At box 806, the computing system identifies a ranking of the datasets. For example, each of the datasets in the plurality of structured datasets 122 may be associated with a priority value. Each of the structured datasets 122 may have a different priority value, such that a ranking of the structure datasets 122 may be determined. The subset of the structured datasets that are identified as being available in box 802 may therefore also have a ranking based on the priority value of each of the selected datasets.

In some examples, the priority value and/or ranking of the structured datasets is user-specified, for example, by an administrator of an organization or group to which a user account belongs. As an illustration, a particular organization that may subscribe to a service provided by the searching system described herein may have an administrator that can configure certain aspects of the searching system for use by individuals logging into the searching system with user accounts that are affiliated with the particular organization. One of these aspects may be an administrator-specified ranking of the structured datasets.

At box 808, the computing system creates a database query for querying an initial database. The initial database may be a highest-ranked of the subset of datasets that are available for querying. The database query may be formed using the identified entity and one or more keywords. For example, for the highest-ranked dataset, the computing system may create an SQL query to access a field that specifies database members that include the identified entity and each identified keyword. An example statement may select from an (entity) table the data that is stored for a certain (date), where the (entity) and (date) values were selected from the query.

At box 810, the computing system may determine whether there is a result to the query of the dataset (for the highest-ranked structured dataset in this example). In some examples, the structured query engine 121 may execute the database query on the highest-ranked dataset 121, and determine whether the database query returns a result.

If there is a result to the query, the computing system may determine whether a confidence score of the result exceeds a threshold (box 811). If so, the computing system may provide the result for display by the computing device (box 812). If the confidence score of the result does not exceed the threshold, the computing system may provide the result for display by the computing device along with suggested alternative queries ranked in an order according to confidence scores for the suggested queries (box 813). The suggested queries may be provided in line with the provided result. In some examples, the computing system provides only a single result to a query, because the field of the database may only store a single result (and the computing system may stop querying structured datasets after it finds a result).

At box 814, in those examples in which the computing system is unable to find a result to the query in the highest-ranked structured dataset (or is able to determine from the values of the entity and the keywords that the highest-ranked database would not have a result), the computing system may determine whether there is another structured dataset available for querying from the identified subset of structured datasets.

At box 816, if there is another structured dataset available, the computing system may create a database query for a next-highest-ranked structured dataset. In some examples, the query is the same as the database query that was already executed, but is run on a different structured dataset. In some examples, the query is different, for example, because initially-queried dataset and the dataset to be newly queried have different structures (e.g., different dimensions and members).

For example, the initially-queried dataset may have had a dimension for "car type", a dimension for "year", a dimension for "state", and a dimension for "sales", and as such the system may have transformed a user query of "What were the sales for Honda Accord in Minnesota for 2012" in to a query that was configured to select data from the database members "Honda Accord", "2012", "Minnesota" and "sales." Although the initially-queried dataset was structured to store information for this value, the query was unsuccessful as previously discussed (e.g., because the relevant field was blank). The newly-queried dataset, however, may only have the database members "Honda Accord", "2012", and "sales", and therefore the computing system may create a database query that is configured to select data from the union of these members, and therefore that is different from the initially-queried dataset.

At box 810, the computing system again determines whether there is a result to the query (this time using the query that was created for the newly-queried dataset). Again, if yes, then the computing system performs the operations of box 811 (and either box 812 or 813) to provide the result for display. If not, the computing system again determines whether there is another dataset that is available for querying. If yes, the cycle continues until a result is eventually obtained or the computing system cycles through all available structured datasets. At that time, instead of returning an empty result page, the computing system may perform the operations that are described with respect to FIG. 5 to use the query to search one or more unstructured datasets. The user interfaces for querying structured datasets and for viewing the results there are described with reference to the following figures, and are generated using the result user interface generator 124 (FIG. 1).

Figure 9:
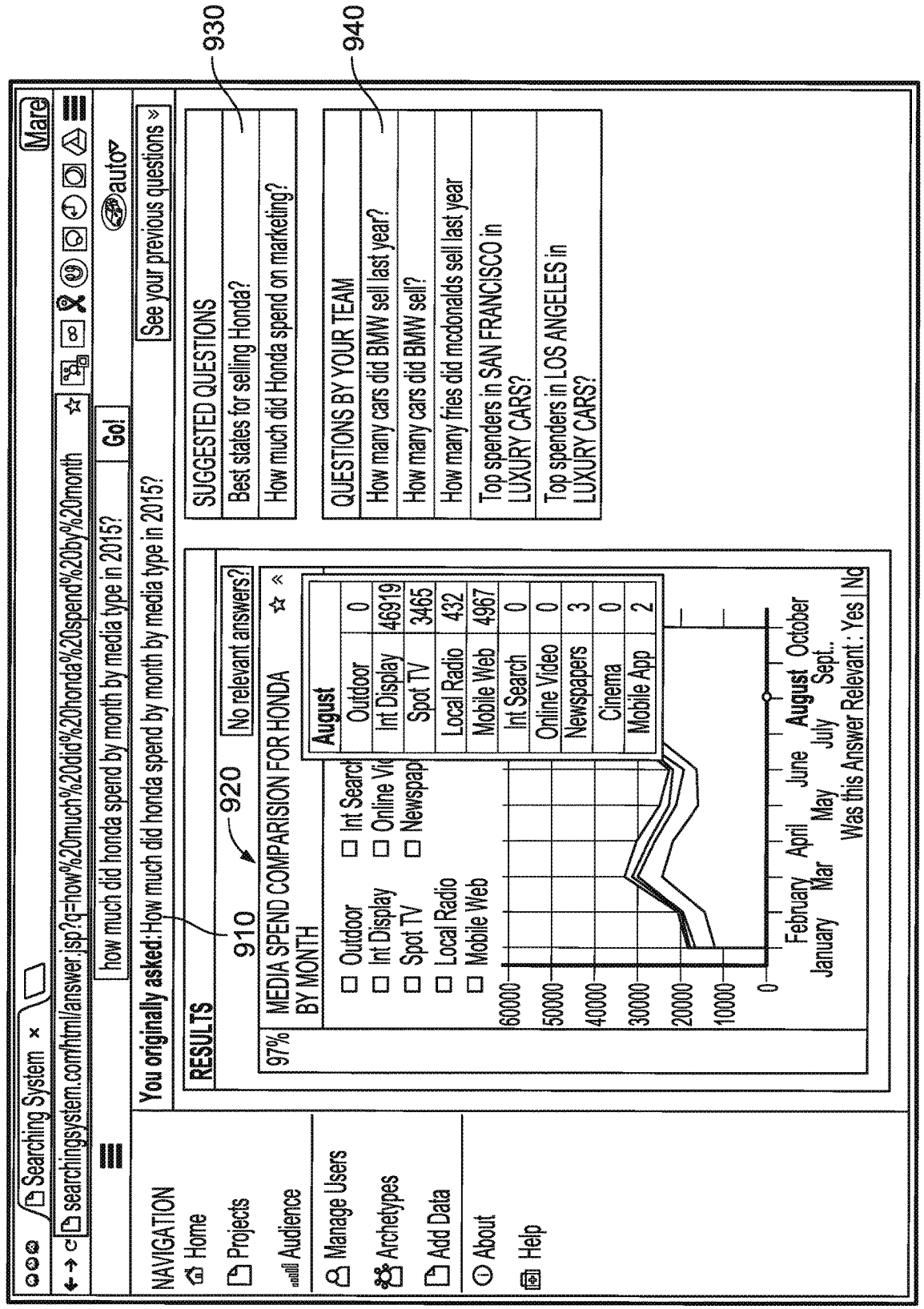
FIG. 9 shows a webpage that includes a result to a query of a structured dataset, in which the highest-ranking result has a confidence score that exceeds a threshold.

FIG. 9 shows a webpage that includes a result to a query of a structured dataset, in which the highest-ranking result has a confidence score that exceeds a threshold. In this example, in response to the query 910 that asks "how much did Honda spend by month by media type in 2015," the computing system identifies a single result 920 with a confidence score of 97%. No suggested queries are displayed inline with the result 920 because the confidence score here was above a predetermined threshold (e.g., 80%). Still, the web page displays a list of suggested questions 930 and a list of previous questions by the user's team 940 to the side of the web page.

The result 920 here includes a graph that is based on data that was specified by the structured dataset that was queried. For example, the database query may return a collection of data, such as a time-ordered series of sales values for each of 12 months in a given year for several different media types (e.g., "Outdoor" and "Int Display"). The computing system may be configured to recognize from the format of the data or from an identifier stored with the data, that this information may be displayed in a line graph, and may generate a display of a line graph (or at least may generate code for configuring the computing device 102 to present such a display). On the other hand, the computing system may not be configured to automatically generate graphs or tables from data that is retrieved from unstructured datasets. For example, the result 604a (FIG. 6) may appear in graphical format only because that item was a picture pulled from the source document. The information may not have been formed into a table or graph by the computing system, as can occur with certain structured data results.

Figure 10:
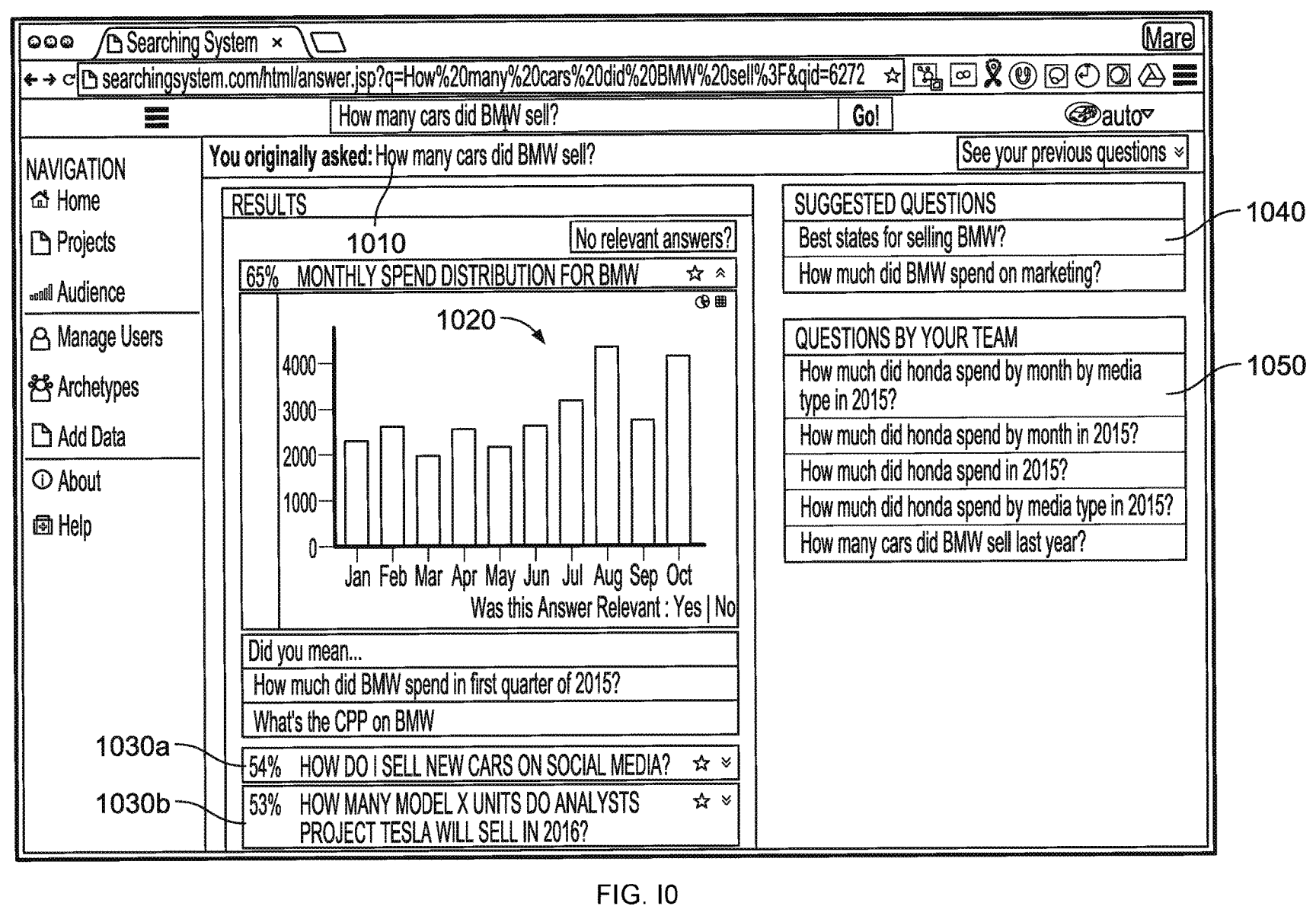

FIG. 10 shows a webpage that includes a result to a query of a structured dataset, in which the highest-ranking result has a confidence score that does not exceeds a threshold. For example, the highest-ranking result 1020 to the query 1010 only has a confidence of 65%, which may be below the confidence score threshold of 80%. With result 1020, the computing system may have transformed data values in the result into a bar chart that graphically illustrates the data values.

Because the result 1020 has a confidence score that is below the threshold, the computing system may cause the result page to present suggested questions 1030a-b along with the result. The computing system may also present a separate list of suggested questions 1040 and a list of questions by the user's team 1050, but those questions may not be in line with the result, may not include a confidence score for each question (and be ordered according to the confidence score), may not include an ability to "save" a question (e.g., along with its responsive single answer) by selecting a user interface element that is in the shape of a star, and may not be user-expandable by selecting the question (e.g., the text of the question or the arrows to the right of the "star" user interface element).

Figure 11:
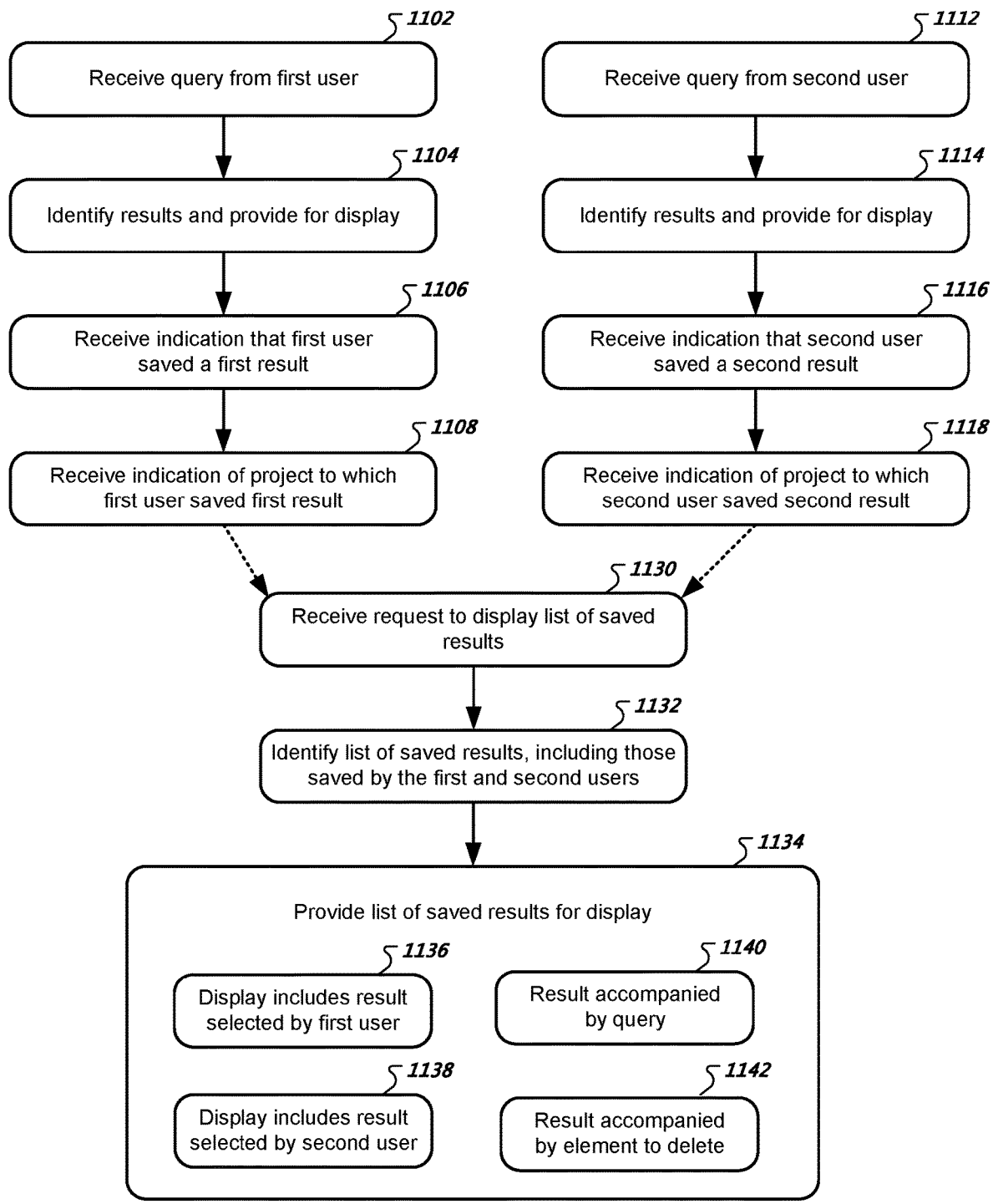
FIG. 11 shows a flowchart of a process for saving a result to a query.

FIG. 11 shows a flowchart of a process for saving a result to a query. This process may allow a user to select results from multiple different queries for later viewing through a display on a saved search results screen.

At box 1102, the computing system receives a query from a first user. For example, the computing system 108 may receive a query from a first computing 102 while that first computing device 102 is logged into a first user account for the searching system (and through user interaction with a web page that was customized for display by the first computing device 102 due to the first computing device 102 having been logged into the first user account).

At box 1104, the computing system identifies results to the query and provides results for display by the computing device 102, as described throughout this document.

At box 1106, the computing system receives an indication that the first user saved a first result. For example, the computing device 102 may display one or more results to the query, and each result may include a user interface element that a user may select with a single user input action (e.g., a single click or a single tap of the user's finger) in order to indicate that the selected search result is to be saved for later presentation. As a result of user-selection of the user interface element that indicates that the selected search result is to be saved, the computing device 102 may send a communication for receipt by the server system 108 that indicates that that a user selected to save the search result. As an illustration, a user may select the "star" user interface element that accompanies any of the search results presented in FIGS. 6, 7, 9, and 10.

At box 1108, the computing system may receive an indication of a project to which the first user saved the first result. For example, in response to a user selecting to save a result, the computing device 102 may present a dialog box that presents a list of projects (selected from project storage 130) to which a user can save the result, and may receive user input that selects one of the projects. The list of projects may include one or more projects that were created by the user (or more accurately through user input with a device while that device was logged into the user account), and can also include one or more projects that were created by other users (e.g., through input provided through use of other user accounts). A user can also provide input to create a new project (e.g., by typing a name for the new project). As a result of user input selecting an existing or new project, the computing device 102 may transmit to the computing system 108 an indication not only of the saved result, but also the project to which the result is to be saved.

Figure 12:
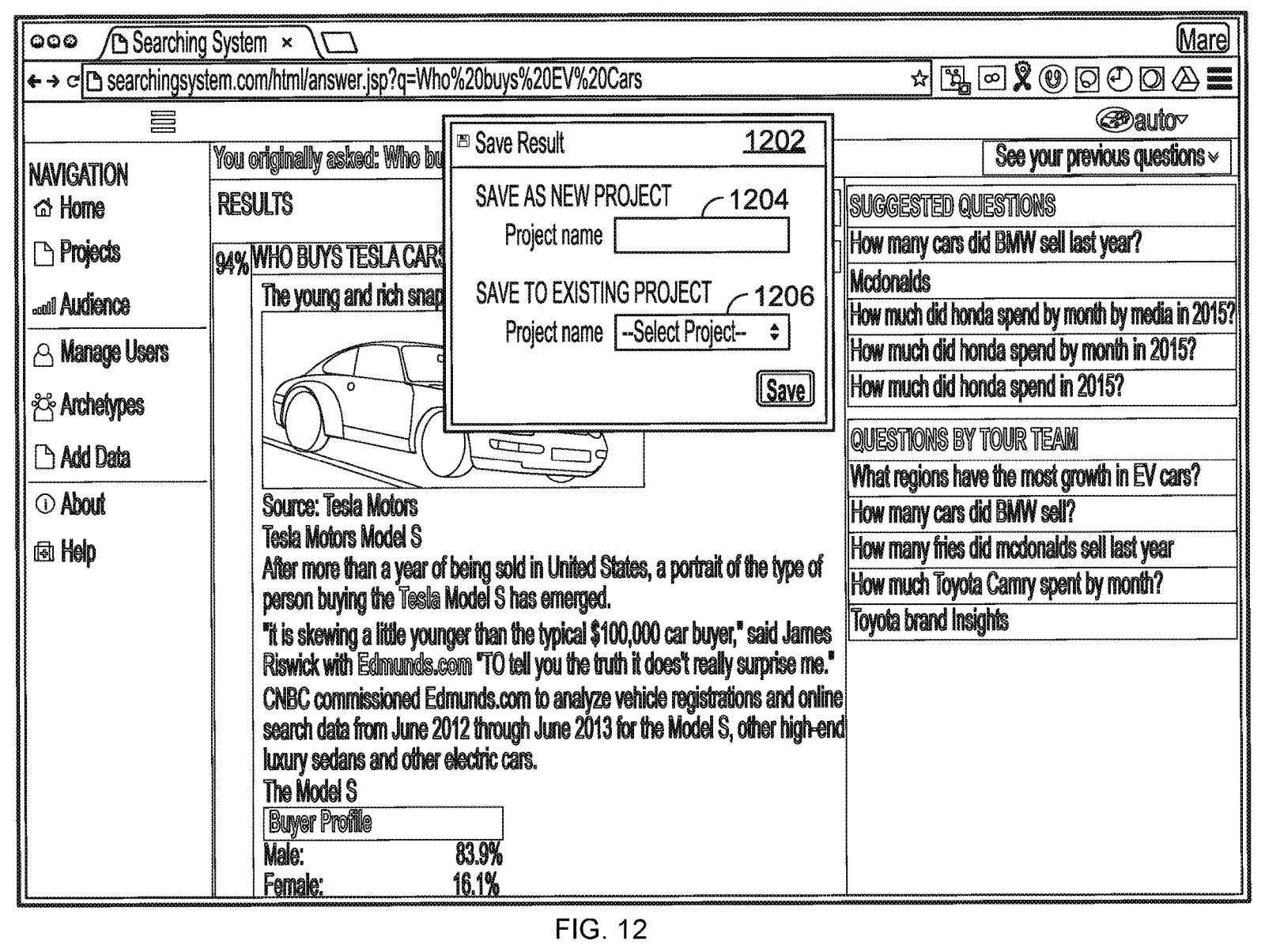

As an illustration of identifying a project, in response to a user selecting a user interface element to save a search result (e.g., a "star" user interface element), the computing device 102 may present the dialog box 1202 that is presented in FIG. 12. This dialog box may include a pull-down list 1206 to select any of multiple projects that have been created by a user of the logged-in user account (e.g., "auto" in this example), or in certain examples any project created through use of any user account associated with a same group as the logged-in user account. A user can also type a new project name into the "Project Name" text entry box 1204 and click the "Save" user interface element to save the selected search result to a new project.

In some implementations, a user may save multiple results that are presented in response to a query, for example, by selecting a user interface element that is displayed for each of the results. In some implementations, a user may save one or more results for each of multiple different queries.

At boxes 1112 through 1118, the same or similar operations can occur for a second user (e.g., for user interaction provided while a computing device is logged into a second user account).

Figure 13:
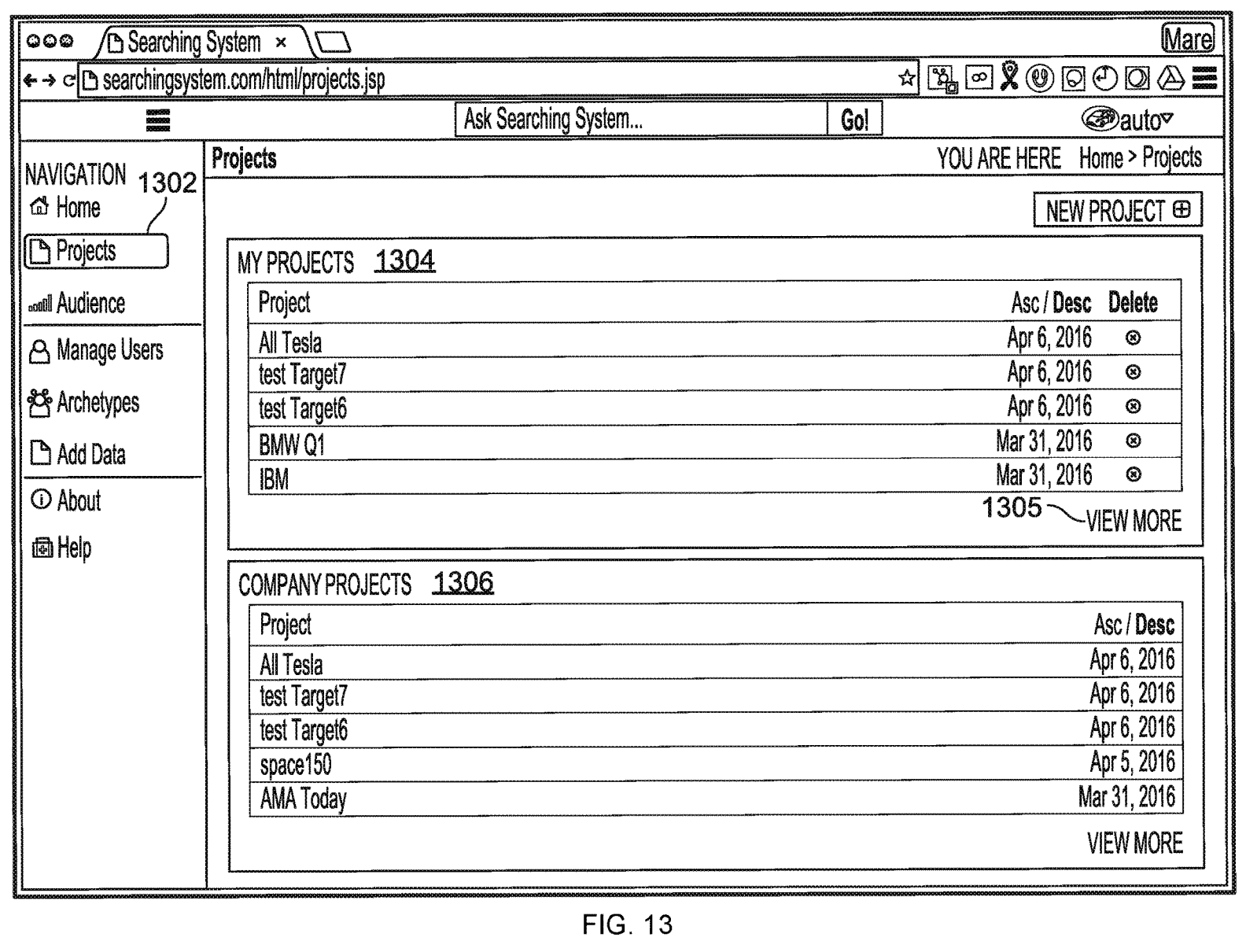

In some examples, in response to a user selection of the "Projects" user interface element 1302 in the web page side bar, the computing device 102 may display the "Projects" web page that is shown in FIG. 13. The Projects web page may include a list 1304 of "My Projects," which may show at least some of the projects that were created through use of the logged-in user account. (All such projects may be viewed by selecting a "view more" user interface element 1305.) The Projects web page may also include a list 1306 of "Company Projects" that can include all or at least some of the projects that may be created by user accounts that are affiliated or otherwise assigned to a same organization or group of accounts as the logged-in user account. These projects may be retrieved from a projects storage 130.

At box 1130, the computing system receives a request to display a list of saved results. For example, either the first user or the second user may request that a web browser navigate to a web page that displays a saved list of results. The request may occur as a result of a user selecting one of the projects that is presented by the web page in FIG. 13.

At box 1132, the computing system identifies a list of saved results. The list of saved results may include those results saved by the first user and those saved by the second user. In some examples, the list of results is those that are saved to the user-selected project, in distinction to those that are saved only to another project.

At box 1134, the computing system provides a list of saved results for display. For example, the computing system 108 may provide data (e.g., web page code) for receipt by the computing device 102, to cause the computing device 102 to render a display of the list of saved results when then web page is rendered by a web browser that is executing on the computing device 102. The displayed list can include a result that was selected by a first user (box 1136) and a result that was selected by a second user (box 1138), regardless whether the list is being displayed for presentation to an account of the first user or an account of the second user.

Figure 14A:
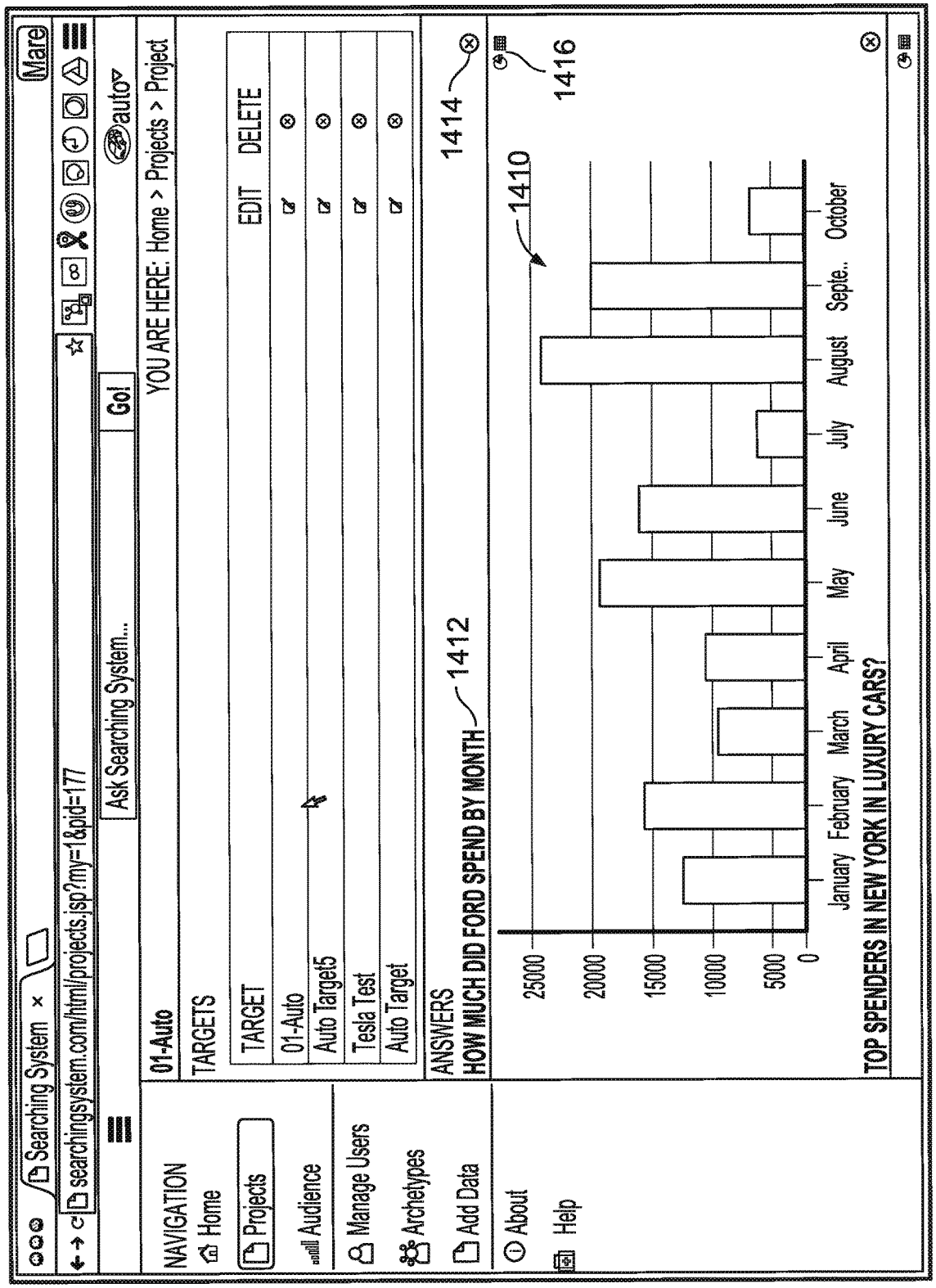
FIGS. 14A-B show a web page that presents a list of saved search results.
Figure 14B:
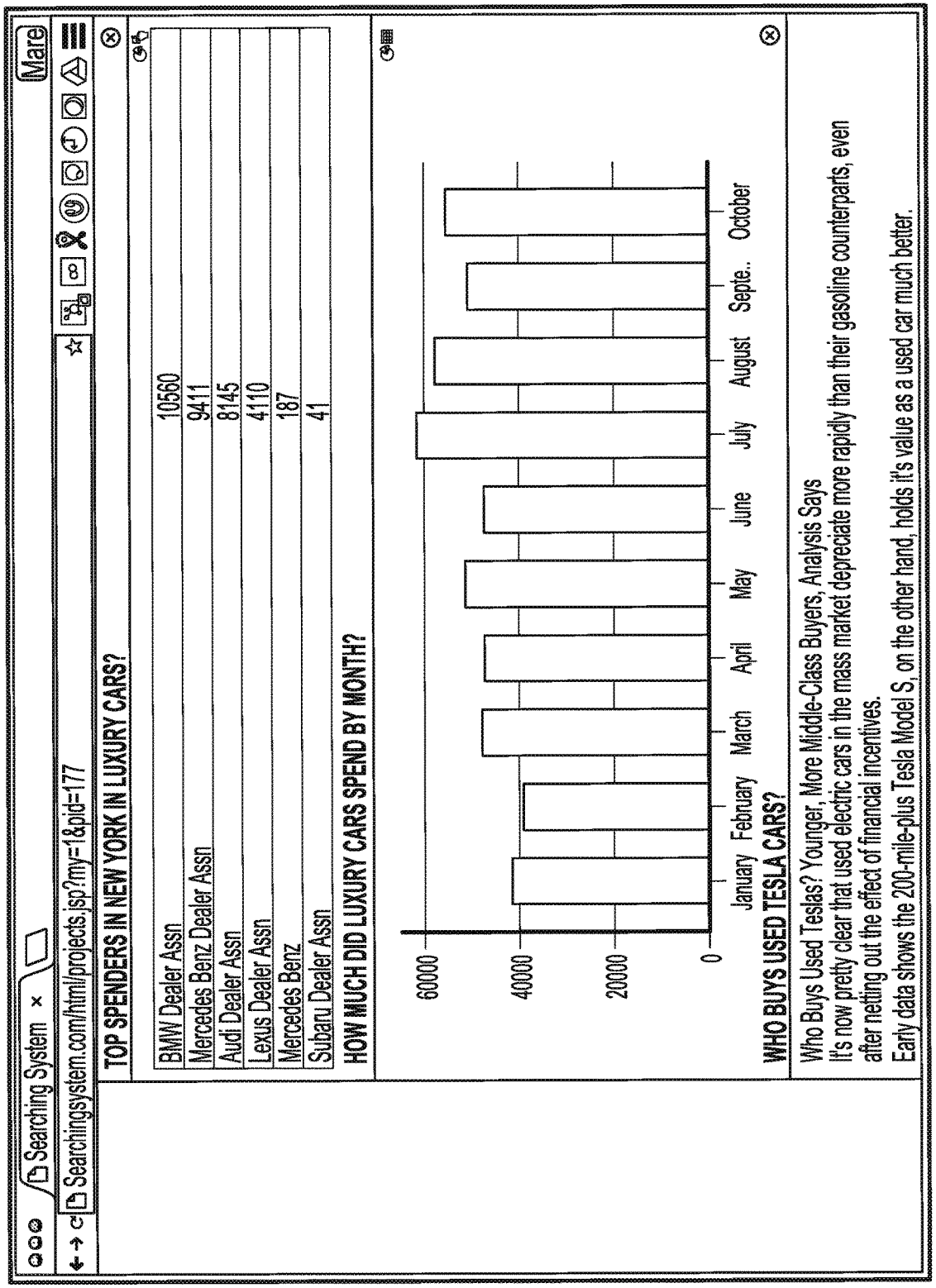

As an illustration, the presented list of saved results may appear as that shown in FIGS. 14A-B. In this example, the top result includes result content 1410, the query 1412 that was previously submitted to obtain the result content, a remove interface element 1414 that can be selected to remove the result (and the accompanying query) from the list of saved results, and user interface elements 1416 for toggling between graphical and table views for the data. Each of the results shown in FIGS. 14A-B include these elements.

At box 1140, each of the saved results that is presented for display may be accompanied by the query that a user provided in order to access the result. The query may not be pre-affiliated with the result, and thus may represent the unique combination of words that a user typed in order to retrieve the result.

At box 1142, each of the saved results may be accompanied by an element to delete the result. For example, in response to user selection of the element, the computing system may remove the selected result from the list, so that the same user, or users of other accounts, would no longer view the saved result.

Figure 15:
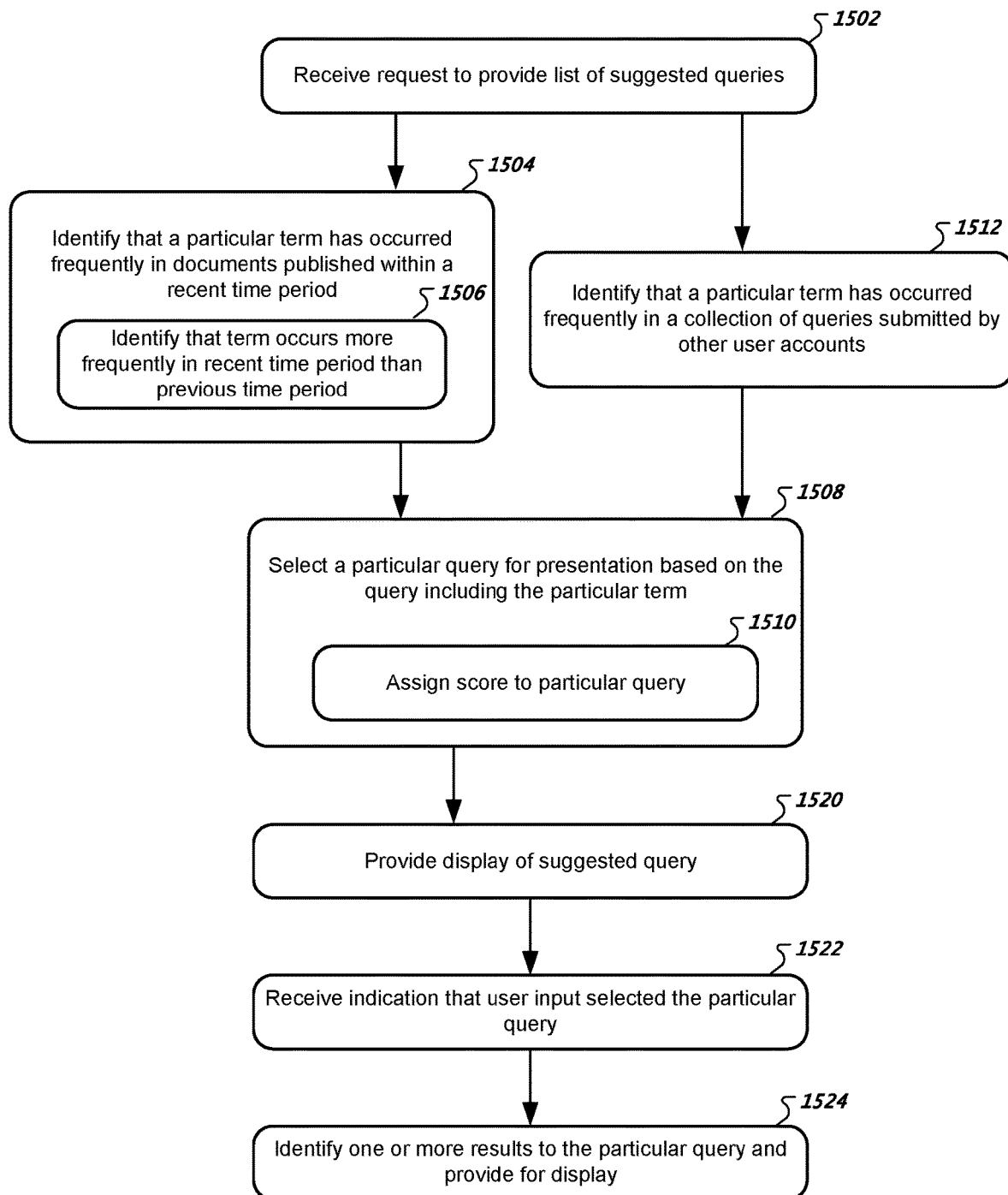
FIG. 15 shows a flowchart of a process for suggesting queries based on frequently-used terms.

FIG. 15 shows a flowchart of a process for suggesting queries based on frequently-used terms. This process may be used to generate suggested queries that appear on various user interfaces that are described throughout this disclosure and that are shown in the figures, for example, the suggested queries in lists 240 (FIG. 2A), 610 (FIG. 6), 710 (FIG. 7), 930 and 940 (FIG. 9), and 1030a-b and 1040 (FIG. 10). The selection of the suggested queries may include selecting queries that include terms that have been occurring frequently (e.g., "entities" that have occurred frequently in recently published articles, such as news articles).

At box 1502, the computing system receives a request to provide a list of suggested queries. For example, a user of computing device 102 may have clicked a link on a first web page or otherwise provided user input to request navigation to a second web page. The server system may be configured to generate the second web page to include a widget that includes a list of suggested queries (e.g., lists 240, 610, 710, 930, 940, and 1040), or may include a list of suggested queries in line with the search results (e.g., suggested queries 1030*a-b*).

At box 1504, the computing system identifies that a particular term has occurred frequently in documents published within a recent time period. In some examples these documents are news articles or other publications that were published by their author or first accessed by the searching system in a recent time period. The identification of the particular term may be an identification that the particular term occurs more frequently than other terms (e.g., it is one of the N most popular terms in the time period and is designated as a frequently-occurring term for that reason). The terms for which frequency data is calculated may be the "entities" discussed elsewhere in this document (e.g., proper nouns that are recognized by the searching system). In some examples, the recent time period is a most-recent period of time for which the computing system stores the news articles or publications (e.g., from the current moment, going back 1, 5, 10, or 30 days).

In some examples, the identification that the term occurs more frequently in the recent time period is an identification that the term occurs more frequently in the recent time period than in a previous time period (box 1506). In other words, the word may be "trending" or becoming more popular. In these examples, the frequency data for the recent time period may be compared to the frequency data for a previous time period to determine whether the frequency of usage has increased. As stated above, the recent time period may extend from a current moment back a number of days (e.g., 10 days), while the previous time period may extend from that number of days (e.g., once again 10 days) back more days (e.g., back another 10, 30, or 100 days, or through the remainder of the data). In some examples, the computing system does not look at usage based on discrete time periods, and uses various formulas to generally detect whether the word usage is increasing over time.

At box 1508, the computing system selects a particular query for presentation based on the query including the particular term. For example, the computing system may select the particular query for presentation in a list of suggested queries. In some examples, the computing system may determine those terms that are occurring most-frequently in the published documents, and identify previously-submitted queries that include those terms. The selection may include assigning a score to a particular query (box 1510) or adjusting a score of the particular query based on the particular query including a frequently-occurring term. Queries that are candidates for selection but that do not include a frequently-occurring term may not see their scores affected at all, or in the same manner.

At box 1520, the computing system provides a display of the suggested query. The display may include displaying the suggested query along with a collection of other suggested queries, for example, as shown in lists 240 (FIG. 2A), 610 (FIG. 6), 710 (FIG. 7), 930 and 940 (FIG. 9), and 1030*a-b* and 1040 (FIG. 10). The queries in the lists may be selected based on scores that are calculated using various metrics, and the presence of a frequently-occurring term in the query may be one of the metrics. Other metrics may include how frequently a query is submitted, how relevant the query is to recent queries by the same user, etc.

At box 1522, the computing system receives an indication that user input selected the particular query. For example, a user may have clicked on the particular query using a mouse, or pressed a location of a touchscreen at which the particular query was displayed.

At box 1524, the computing system identifies one or more results to the particular query and provides the one or more results for display. For example, the computing system may either expand the query to display a result to the query in the same display, or may navigate to a different web page and present one or more results to the query, just as if a user had typed the same query into a query input text box.

In some implementations, the computing system selects a query based on similar frequency of usage data, but instead of the word frequency data being drawn from recent articles and documents (e.g., newspaper articles or published web articles), the word frequency data is drawn from recent queries that were submitted by other users. For example, at box 1512, the computing system may identify that a particular term has occurred frequently in a collection of queries submitted by other user accounts, where these other user accounts may be accounts of that are assigned to a same organization or group. The analysis of the particular term may be the same or similar to that described above with respect to boxes 1504 and 1506, and may identify which word or words occur frequently in recent data or that have been trending and increasing in popularity.

At box 1514, the computing system selects a particular query for presentation based on the query including the particular term.

Figure 16:
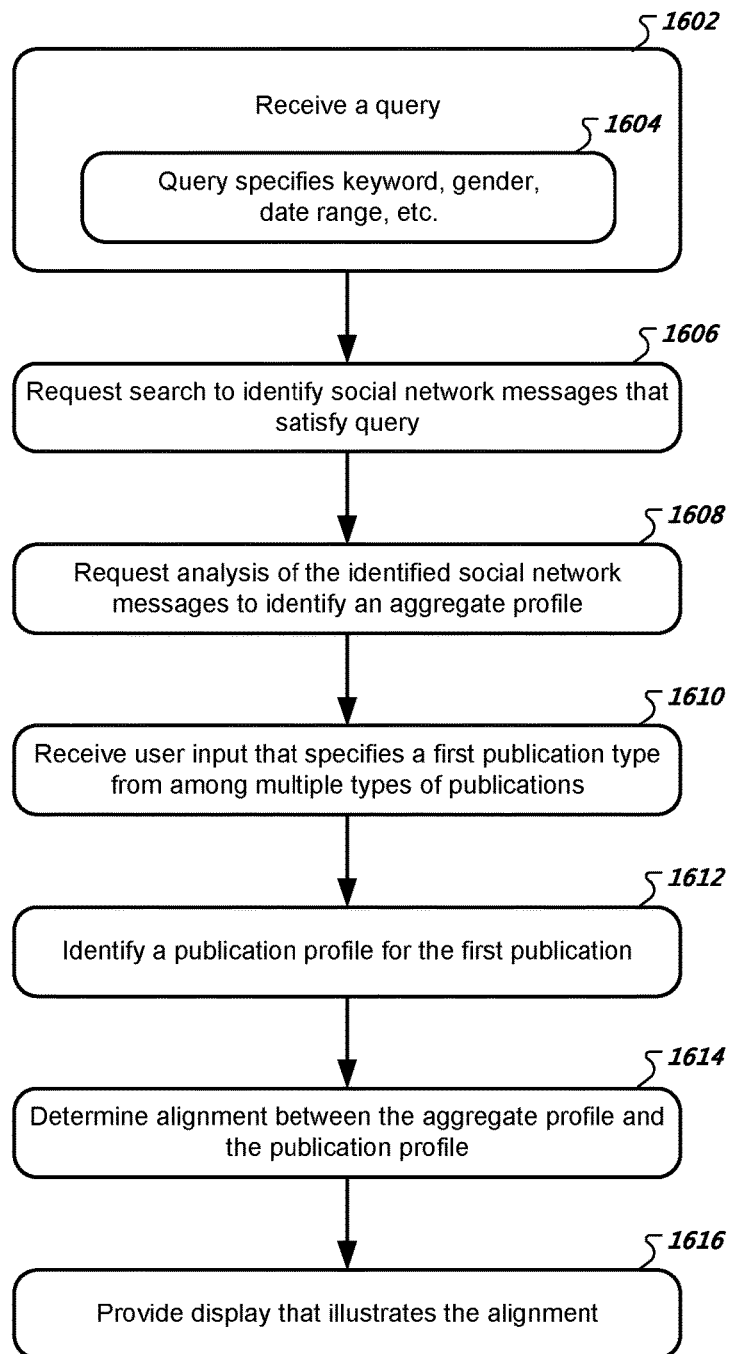
FIG. 16 shows a flowchart of a process for identifying a publication that is relevant to a subset of social network users.

FIG. 16 shows a flowchart of a process for identifying a publication that is relevant to a subset of social network users. This process allows a user to identify which one or more publications may provide the best match for a particular user-defined group of individuals, where the group of individuals is identified using a search of social network data. This process is illustrated with reference to the web pages that are shown in FIGS. 17-29.

At box 1602, the computing system receives a query. The query may be entered after a user specifies that the user would like to create a new target (e.g., specify a new query). For example, the computing device 102 may present the web page that is shown in FIG. 17 after a user selects the "Audience" user interface element 1702 in the sidebar of a previous web page. The Audience web page may list multiple user-selectable targets 1704 that the user previously created, along with indications 1706 of the projects to which the user previously assigned those projects. The Audience web page may also list multiple user-selectable targets 1708 that were created using other users accounts from the same organization or group, along with indications 1710 of the projects to which those targets are assigned. To create a new target, a user may select the "New Target" user interface element 1712. The computing system may store the existing and newly-defined targets in the target dataset 128.

Figure 18:
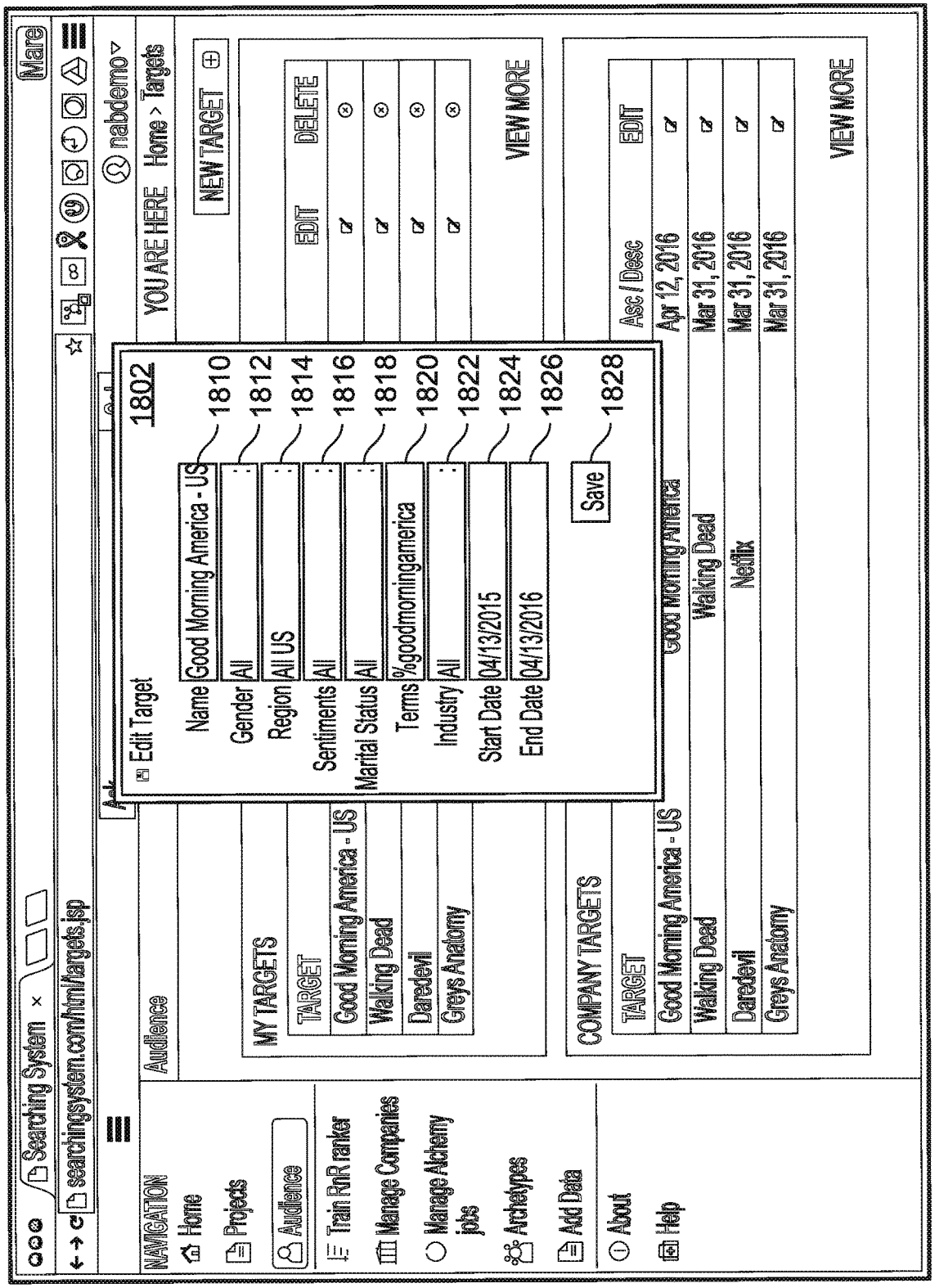
FIG. 18 shows a web page for specifying or editing a new target.

In response to selection of the "New Target" user interface element 1712, the computing device may present the web page that is shown in FIG. 18, which may include dialog box 1802. This dialog box may include various options for specifying characteristics of the target. In effect these are characteristics of a query to be run on data that was generated by various users (e.g., a query of posts generated by users of one or more social networks). The characteristics that the user can specify include a gender 1812 of an individual, a geographic region 1814 (e.g., a state) of an individual, a sentiment 1816 of an individual, a marital status 1818 of an individual, a term 1820 specified in posts by the individual (e.g., #goodmorningamerica), an industry 1822 within which the individual works, a start date 1824 of posts to search, and an end date 1826 of the posts to search.

Using these user interface elements, an individual can specify characteristics of a search of social network posts (box 1604). For example, in this illustration a user has specified to search for posts by all genders, in all portions of the US, with all sentiments, all martial statuses, in all industries, where those posts included the term #goodmorningamerica, and were submitted or published between Apr. 13, 2015 and Apr. 13, 2016. This collection of criteria (or the collection of results that would appear in response to a search using the criteria) may be termed a "target" and a user can specify a name for the target using text entry box 1810 (here "Good Morning America—US"). In response to the user selecting the "Save" element 1828 (or selecting a link to the target on the web page), the computing device 102 sends an indication to the computing system 108 to run a query on the characteristics specified in the query.

At box 1606, the computing system requests that a search be performed to identify social network messages that satisfy the query. For example, the computing system 108 may request that the target identifier 126 perform the identification of social network messages, or may request that an external entity identify such social network messages.

At box 1608, the computing system requests an analysis of the identified social network messages in order to identify an aggregate profile. For example, the target identifier 126 may request that an external system analyze a content of the identified social network messages (e.g., the word usage of the social network messages) and determine values for various personality characteristics, such as "openness," "extraversion," and "curiosity." The determined values may be for an aggregate profile, for example, an analysis that attempts to identify the overall "personality" of that group.

In response to requesting the analysis, the computing system may receive information that identifies the personality characteristics of the aggregate profile, and may provide for display by the computing device 102 a web page that presents the personality characteristics. For example, FIG. 19 shows a web page that indicates values for these personality characteristics in a target group profile section 1902. This web page (along with those shown in FIGS. 17-19 and 22-29) may be generated by the Audience User Interface Generator 132. Each characteristics includes a corresponding line with a dot on it, where placement of the dot to the right on the line indicates a high level of that particular characteristic, and placement of the dot to the left indicates a low level of that particular characteristic.

The web page also includes a Target Archetypes section 1904. This section indicates what percentage of the target users are classified as being of a particular archetype (e.g., a particular personality type). As such, the computing system may have identified not just the personality characteristics for an aggregate profile, but may have also done so for each author of that makes up the aggregate profile. The determination regarding whether a particular author falls under a particular archetype can include identifying whether the determined personality characteristics for that author fall within ranges that are specified for the archetype. Should a user select an archetype (here "The Regel" archetype was selected), the computing system may display information 1906 on that selected archetype.

Figure 20:
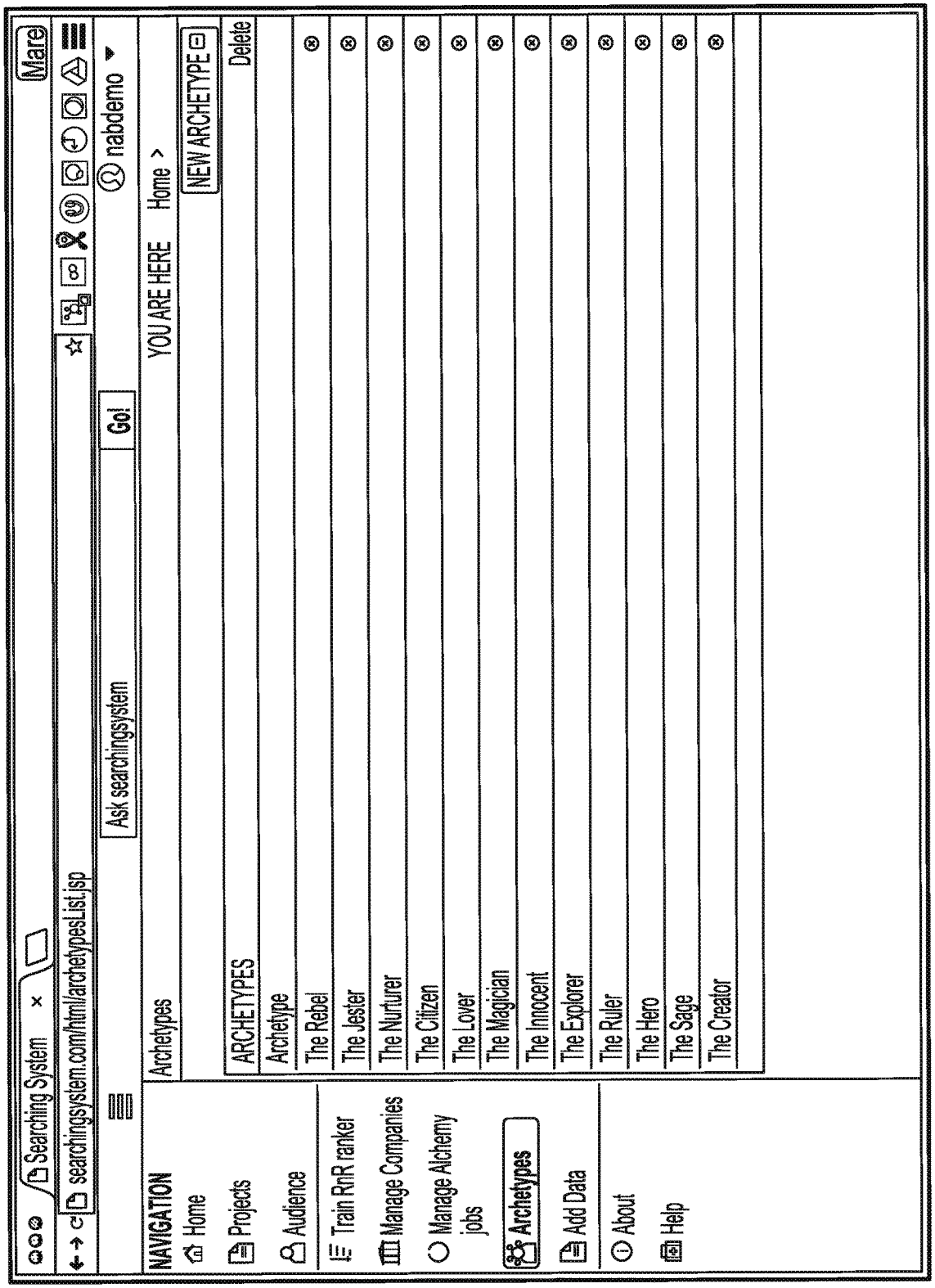
FIG. 20 shows a web page at which a user can select an archetype.

FIG. 20 shows a web page at which a user can select an archetype. A user can navigate to this web page by selecting the "Archetypes" element in the sidebar on the left of most web pages in the searching website. This list of archetypes may be stored in the Archetype Storage 131.

Figure 21:
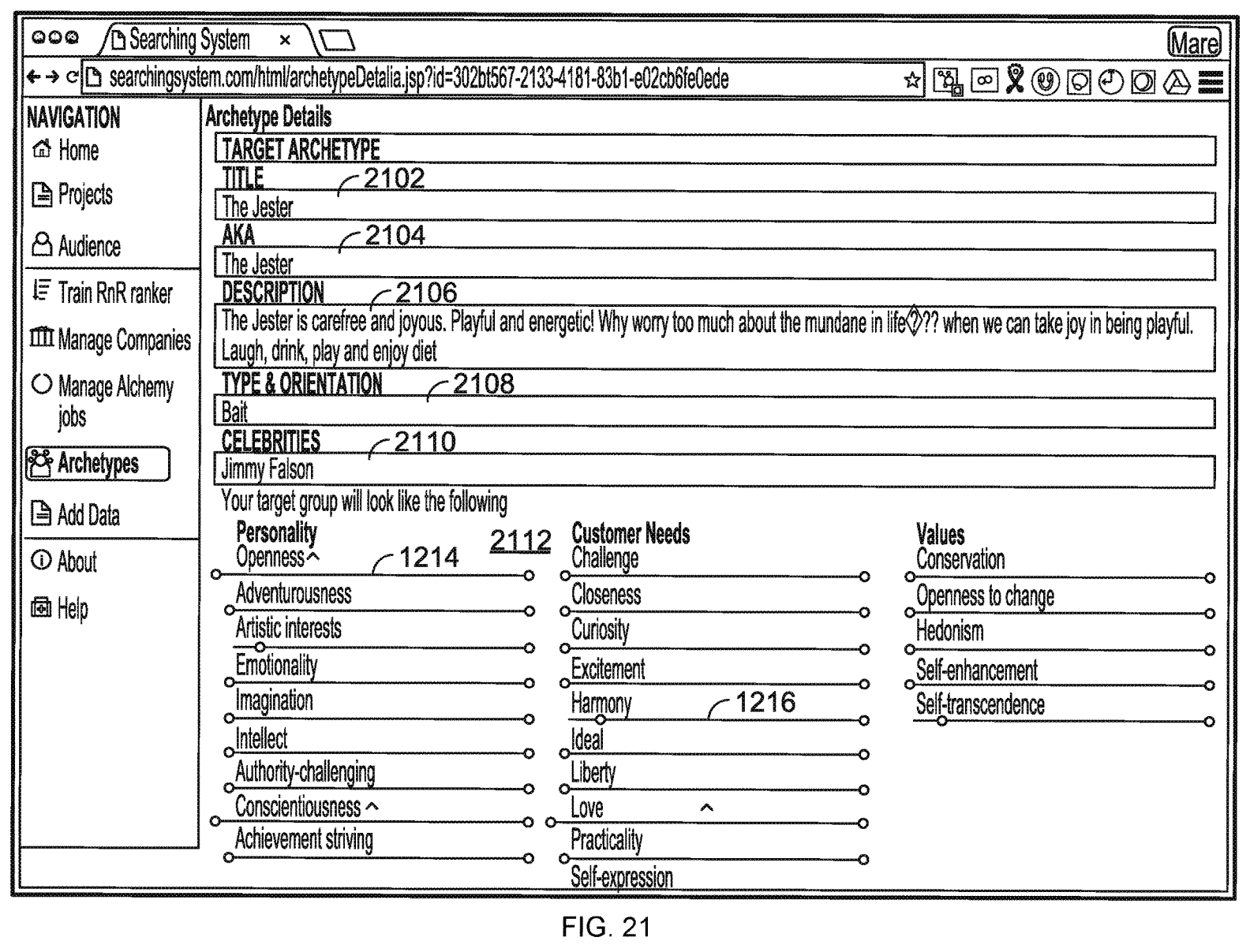

FIG. 21 shows a web page at which a user can specify characteristics for an archetype that the user selected using the web page of FIG. 20. At this web page, the user can specify the title 2102 of the archetype, an also-known-as name 2104 for the archetype, a description 2106 of the archetype, a type & orientation 2108 of the archetype, and a list of zero or more celebrities 2110 that have the archetype. The user can also specify ranges 2112 within which characteristics of social network users must fall in order to qualify as having the archetype. Suppose that the ranges span from 0 to 100. In this example, the "Openness" personality characteristic 1214 is set to accept an entire range, and thus no individual would be disqualified from having the "Jester" archetype based on their openness score. On the other hand, the "Harmony" personality characteristic does not span the entire range, because the lower interface element is moved roughly 10% up the span. As such, let's assume that this means that the range spans from 10 to 100. Thus, a user with an openness score of 9 or lower would not qualify for the Jester archetype. An individual may have to satisfy all characteristics (e.g., their score may have to fall within all ranges specified in the Archetype Details page) in order for the computing system to consider that individual as satisfying the archetype.

FIG. 22 shows another example of the "Dashboard" web page that was shown in FIG. 19, but for a different target and scrolled to the bottom of the page. The "Social Results" section 2102 lists some social network posts that were authored by individuals that satisfied the selected archetype (here "The Citizen" archetype). The media share pie graph 2014 show multiple type of media (e.g., multiple distribution channels), such as magazines, newspapers, digital social, and digital search. The types of media and the distribution may be specified by an administrator of the organization for which the user account belongs (e.g., based on how the company desires to advertise among different types of media).

In box 1610, the computing system receives an indication that user input specified a publication from among multiple types of publications. For example, each of the types of media in the pie graph may be user selectable (e.g., by clicking on a wedge in the pie graph or selecting a name of a media type next to the pie graph).

At box 1612, the computing system identifies a publication profile for a publication of the first type of publication. For example, the computing system may have previously analyzed the content of publications by different publishers of the type of publication (e.g., the content of articles by different newspapers companies of a newspapers type of publication). Using this analysis, the computing system may determine personality characteristics of each publisher (e.g., an "Openness" and "Agreeableness" value for each publisher).

At box 1614, the computing system determines an alignment between the aggregate profile (e.g., the target) and the publication profile. For example, the computing system may determine a difference between an "Openness" value for each of the target and for a particular newspaper, and may determine a percentage difference for the two items (e.g., the values may be 80% aligned if the openness value is 80 for the newspaper but is 64 (80*0.8) or 100 (80/0.8) for the target). The computing system may determine this difference and alignment for multiple characteristics for each of multiple different publications.

At box 1616, the computing system may provide a display that illustrates the alignment. For example, the computing system may provide information for receipt by the computing device 102 that causes the computing device 102 to display the radar map 2106 that is illustrated in FIG. 22. That map illustrates, for each of five publications, an alignment for each of five characteristics. A 100% alignment is represented by the pentagon shape (which represents a particular publication) touching the circle at a corner of the pentagon, while a lower alignment is represented by the pentagon shape having a corner near the center. In this example, the shape 2108 with the largest area has a strong agreeableness alignment (lower-left), but a not-as-strong extraversion alignment (lower-right).

FIG. 23 shows an Archetype tab for the Audience portion of the web page. This web page lists the various target archetypes, just like in the Dashboard tab, but the profile portion 2310 of the web page shows not just a graphical element that identifies a value of the target for each personality characteristic, but also a value of an aggregation of all those that satisfy the archetype criteria for a selected archetype. For example, a green user interface element 2312 identifies an openness value of the aggregate profile for the target, while a blue user interface element 2314 identifies an openness value of the aggregate profile for the subset of individuals in the target that satisfy the selected archetype (which happens to be "The Nurturer" in this example).

Figure 24:
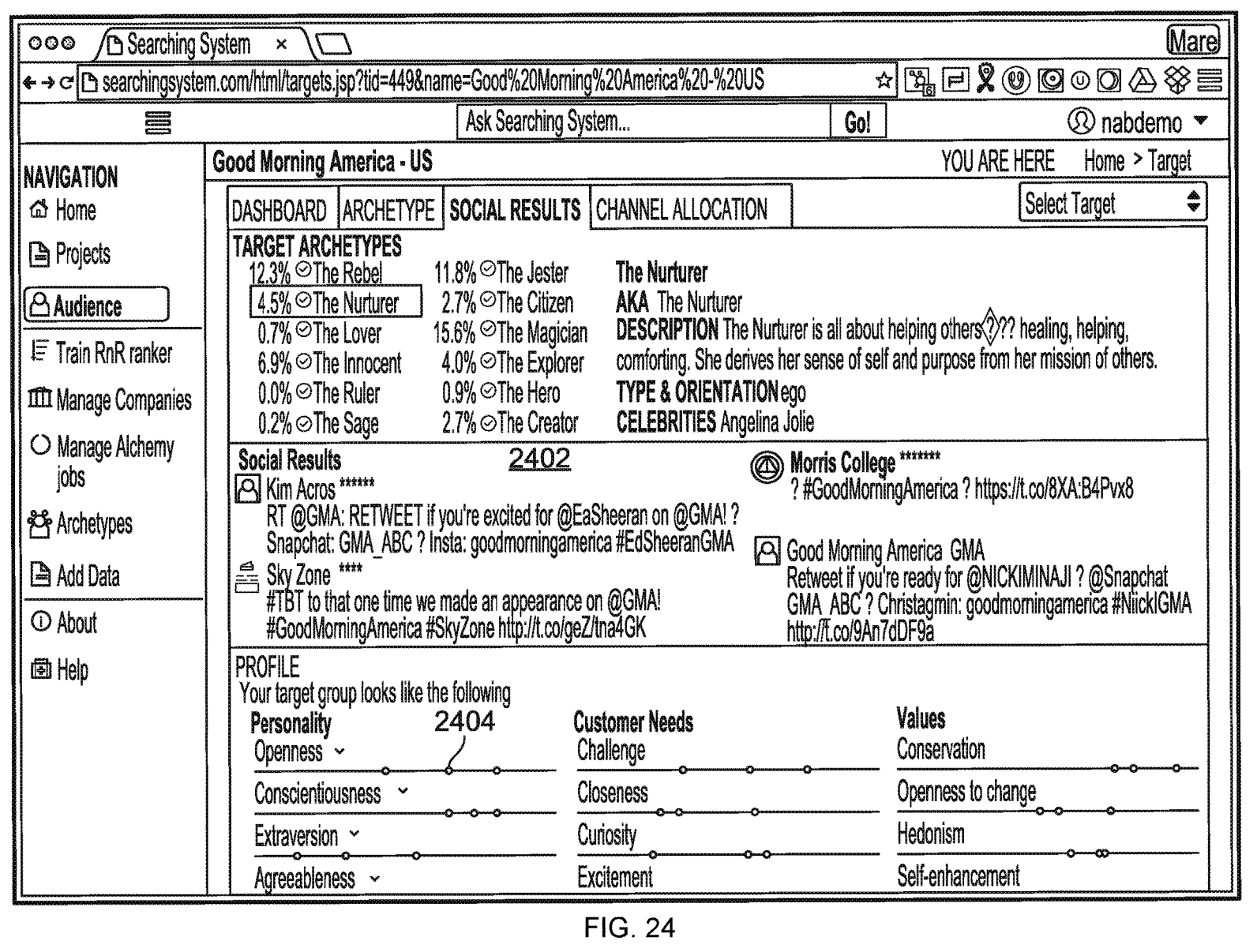

FIG. 24 shows a Social Results tab for the Audience portion of the web page. In this page, a user can select an archetype, and view example social results 2402 for that archetype (e.g., social network posts by individuals in the Target that satisfy the archetype). The profile portion of the web page also includes, in addition to a user interface element for the target and for the archetype (as discussed with reference to FIG. 23) a gray user interface element 2404 for a particular user that authored a selected one of the social media posts.

Figure 25:
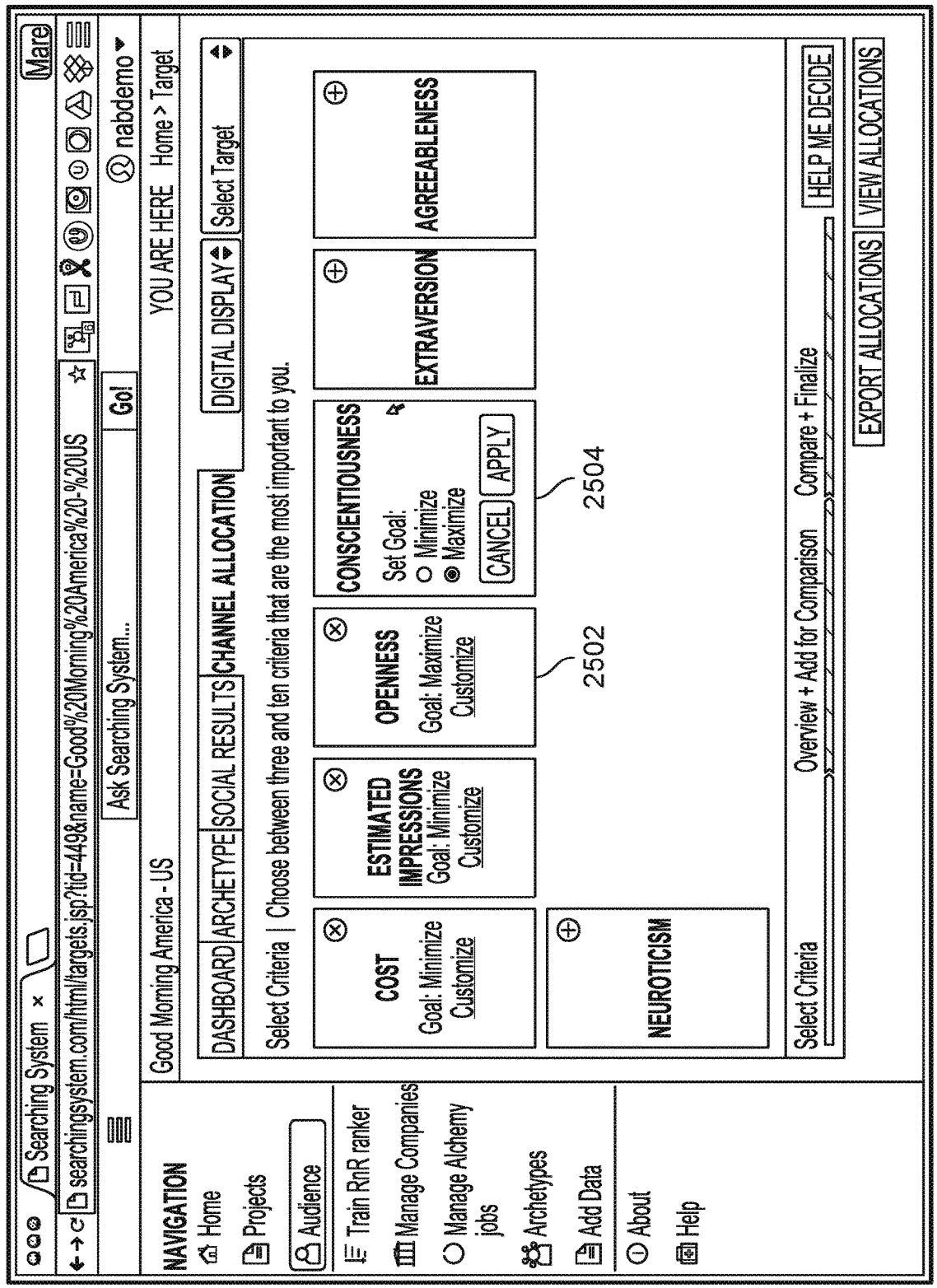
FIG. 25 shows a Channel Allocation tab for the Audience portion of the web page.

FIG. 25 shows a Channel Allocation tab for the Audience portion of the web page. In this page, a user is able to select one or more criteria, for example, by clicking on user interface elements for each criterion. In this illustration, a user has selected the "Openness" user interface element 2502 (causing it to become shaded). Upon selection, a user can select whether to set a goal to minimize or maximize that criteria, as shown by the options presented within the "Conscientiousness" user interface element 2504. In this illustration, the user has not selected the extraversion, agreeableness, and neuroticism user interface elements.

Figure 26:
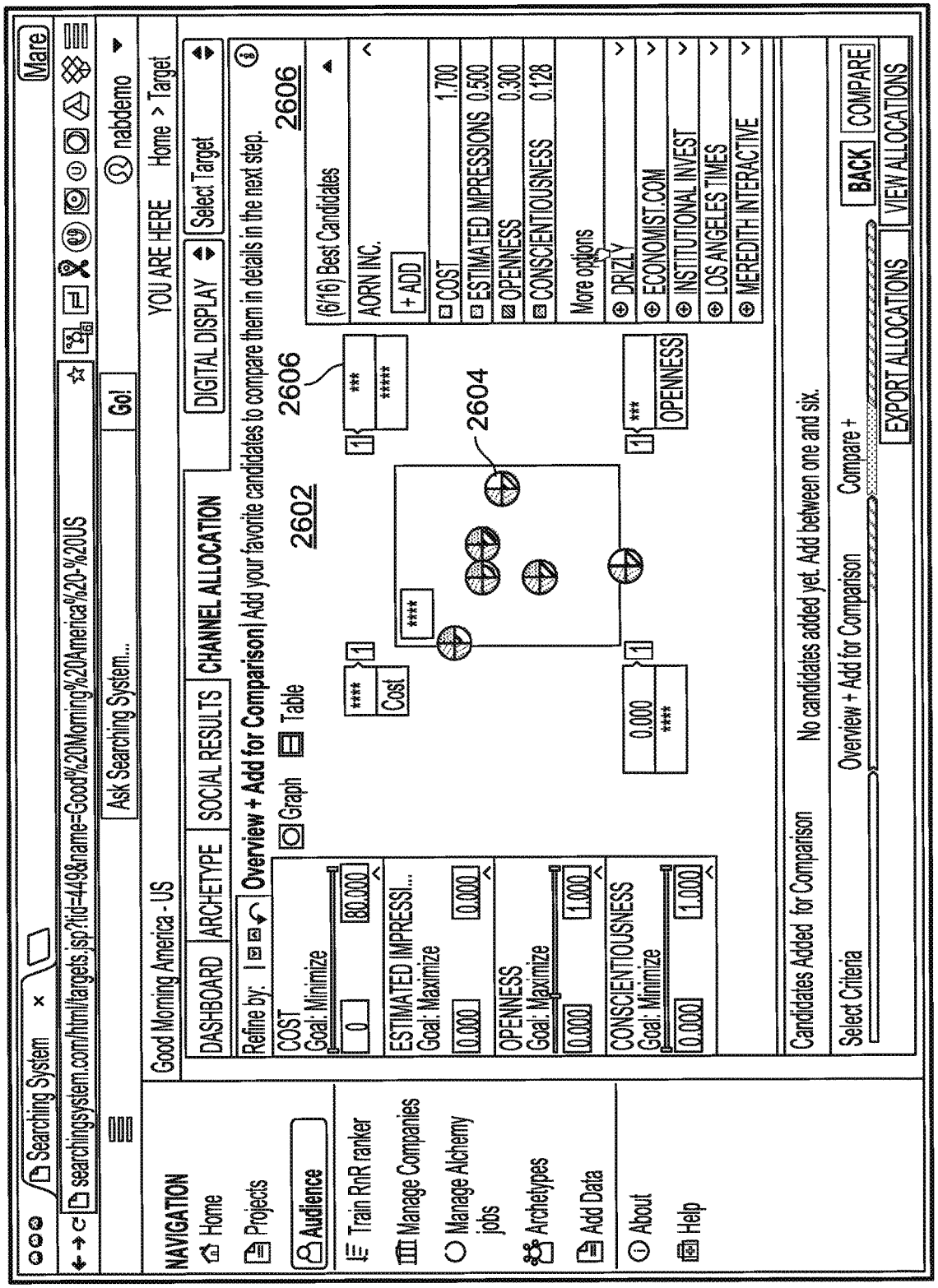
FIG. 26 shows a graphical illustration of multiple user interface elements that represent various publications, arranged in the graphical illustration with respect to various criteria.

FIG. 26 shows a graphical illustration 2602 of multiple user interface elements that represent various publications (here the circles, e.g., circle 2604), arranged in the graphical illustration a various distance from various criteria (here the rectangles in the corners, e.g., rectangle 2606). The criteria may be those selected in the previous web page (FIG. 25), while the publications may be those shown in the radar map (item 2106 in FIG. 22). In this example, if the alignment values for all characteristics/criteria for a particular publication are the same (whether those alignment values may all be low or all high), the circular user interface element for that publication would appear centered between the rectangular user interface elements for the various criteria. A user can view the values for each of the selected circles (e.g., the selected publication) in the bar 2606 to the right of the web page.

FIG. 27 shows the web page that is presented when a user selects the Table user interface element 2702. The table presents the values for each of the metrics. Openness and Conscientiousness values are the alignment values, while cost and estimated impressions may be independent of alignment to the candidate publications.

Figure 28:
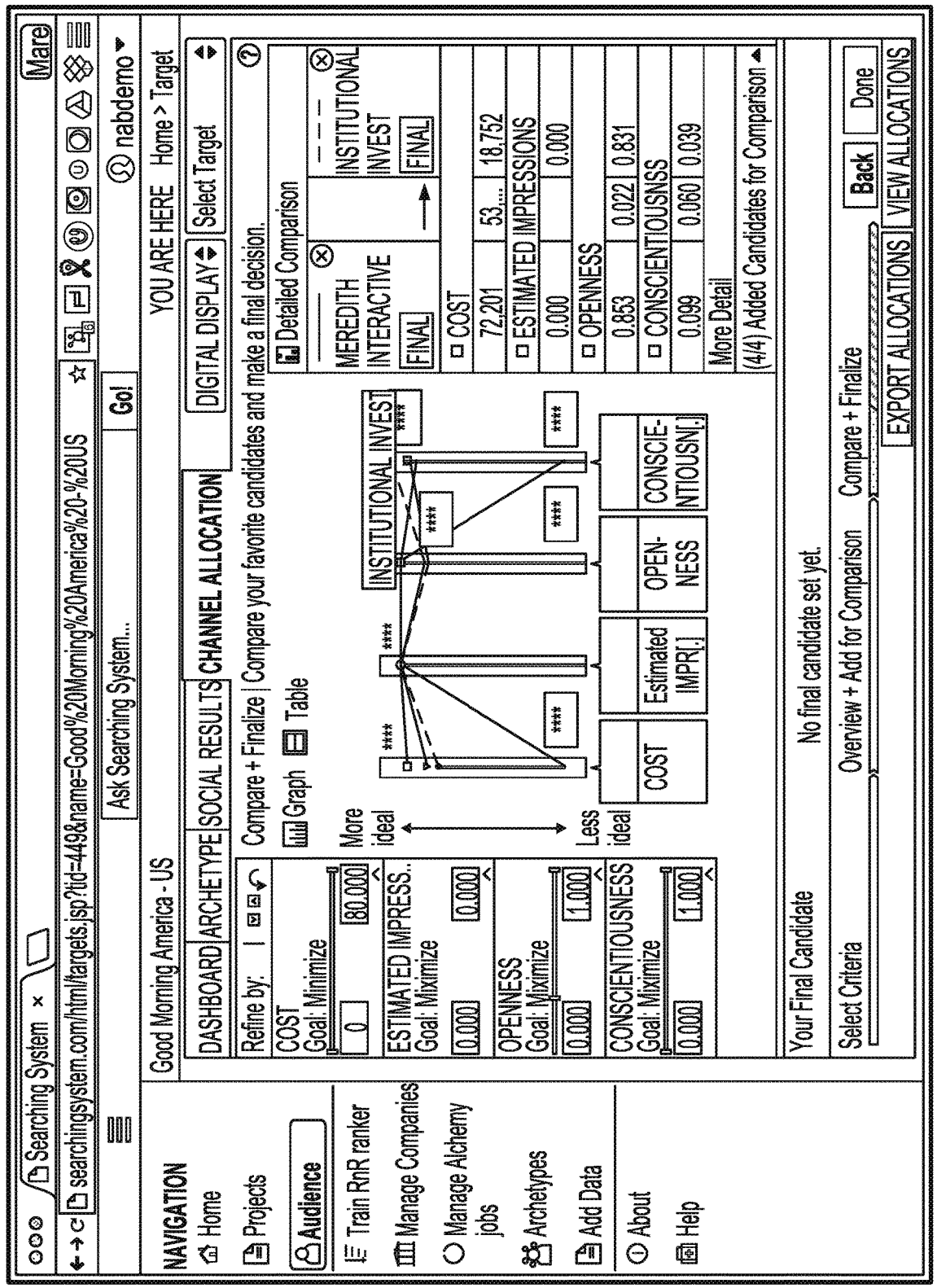
FIG. 28 shows a graphical display that illustrates a degree to which each publication is ideal for each of various criteria.
Figure 29:
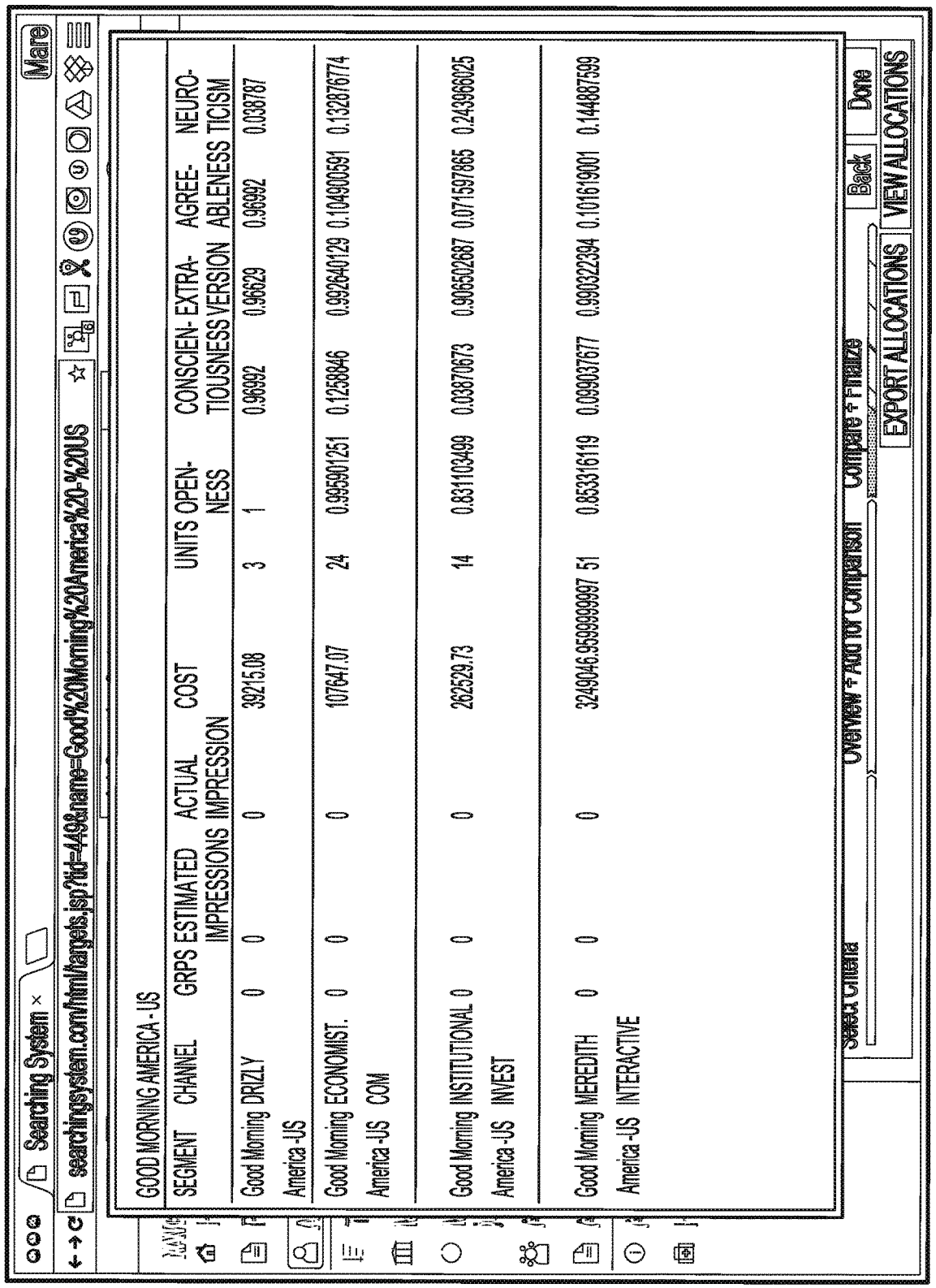
FIG. 29 shows a popup box that shows values in table format.

FIG. 28 shows a graphical display that illustrates a degree to which each publication is ideal for each of the various criteria. For example, the graphical display shows, for each metric, a bar with a graphical element for each publication to represent the how ideal each respective publication is for that metric. A graphical element that is placed closer to the top may be represent a more ideal value, while a graphical element that is placed closer to the bottom may represent a less-ideal value. Each bar may have a graphical element for each publication, and the graphical elements for each publication may be connected by lines among the bars. A user may select two publications (e.g., by clicking on their respective lines) to cause the computing device to display values that indicate the difference between each publication for each metric or criteria (e.g., as bars with accompanying numbers in the graphical display, and in table format to the right of the web page). FIG. 29 shows a popup box that shows the values in table format.

In some implementations, a user of the system described herein may create a target of individuals and analyze information associated with that target to determine which individuals to target in a different dataset. The user may request that the images of the individuals in the target be analyzed to further refine/narrow the target to a subset that has a certain gender, race, and/or age.

As an illustration, an organization may have a dataset that identifies information on certain customers, and may want to send a communication to those of its customers who are women of a certain age and race. The organization, however, may not have all of this information in their dataset (e.g., the age and race of the women). The organization may further not know how these women communicate, and thus how to tailor the content of its communications to these women. Still, using the system described herein, the organization may gather information that specifies characteristics of women that are of the specified age and race, and use that information to select from their own dataset those individuals that are women of the specified age and race (and that potentially satisfy other criteria).

To do so, the organization (e.g., a user that is employed by the organization), may access the interface that is shown in FIG. 18 and may interact with dialog box 1802 to specify characteristics of a target group to be created. These characteristics can include limiting the target group to people that mentioned the name of the organization in social media posts over the last several months. In response to running a search of social media posts to identify posts that satisfy the specified characteristics, the system may present the user with an interface that is similar to that shown in FIG. 19. That interface shows various characteristics of the identified target group of users, such as personality characteristics of the target group and the most-common target archetypes of the target group. A user may select an archetype to narrow the target to those users that have been determined to belong to a particular archetype. For example, the organization may wish to identify those users that not only have posted about the organization within the last few months, but also have the "Rebel" archetype.

The organization may further wish to identify those users that have characteristics that can be identified by analyzing images associated with the social media accounts, such as age, gender, and race. As earlier stated, the organization may wish to send communications to women who are of a certain age and a certain race. Thus, the organization may request that the system analyze images associated with social media accounts of individuals in either the target or sub-segment, to narrow the target to those individuals that have the specified gender, age, and/or race. The images analyzed may include all images uploaded by the individuals to their social media accounts, the profile images of the individuals, and/or those images in which the individuals have been tagged. In some examples, the computing system may allow a user to specify age, gender, and race in the initial criteria for the target group (e.g., in dialog box 1802), rather than requiring the user to first specify a target and then refine that target.

The organization may export information that identifies the individuals in the target group and associated information (e.g., words commonly used by the individuals in social media posts). The organization may then match these characteristics to their own dataset to identify those customers that likely belong to the same group. As an illustration, assume that the organization is introducing a shoe department and wants to send an announcement out to women of a certain age and that like certain luxury brands of shoes, but the organization does not know which of its customers are women of that certain age and that like luxury brands of shoes. In this case, the user could create a target that includes women of a certain age that have posted the names of luxury shoe brands within the last few months. The user can view information on the created target, such as what other items the users talked about, and use this information to identify those users from within its own dataset that match the target (e.g., which users have purchased the other items, and thus are likely to be interested in the new shoe department). The organization can also use the viewed information to determine which words are commonly used by the target group and thus how to structure/phrase a communication to the target group.

Figure 30:
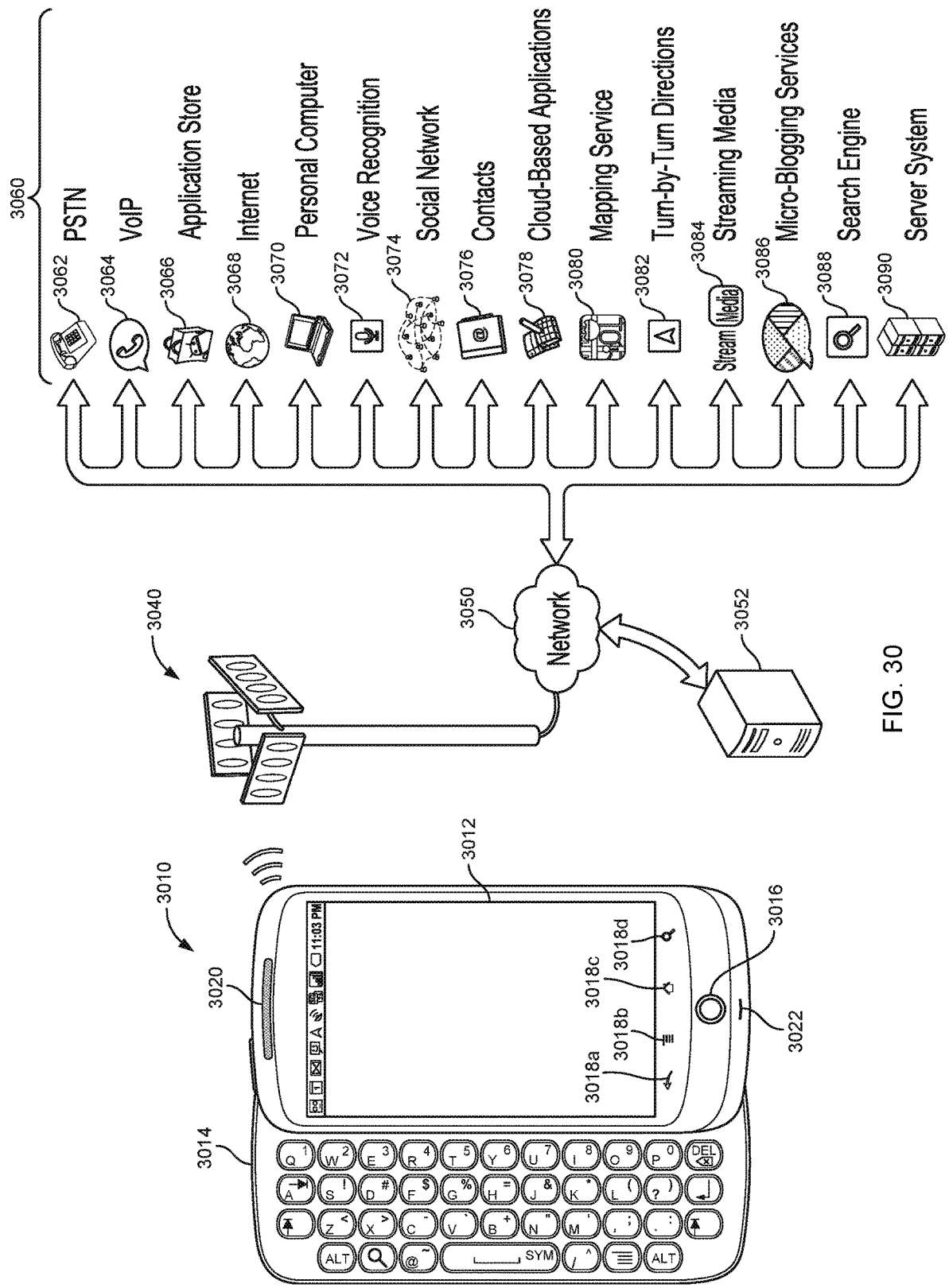
FIG. 30 is a conceptual diagram of a system that may be used to implement the systems and methods described in this document.

Referring now to FIG. 30, a conceptual diagram of a system that may be used to implement the systems and methods described in this document is illustrated. In the system, mobile computing device 3010 can wirelessly communicate with base station 3040, which can provide the mobile computing device wireless access to numerous hosted services 3060 through a network 3050.

In this illustration, the mobile computing device 3010 is depicted as a handheld mobile telephone (e.g., a smartphone, or an application telephone) that includes a touchscreen display device 3012 for presenting content to a user of the mobile computing device 3010 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 3014, physical buttons, trackballs, accelerometers, gyroscopes, and magnetometers).

Example visual output mechanism in the form of display device 3012 may take the form of a display with resistive or capacitive touch capabilities. The display device may be for displaying video, graphics, images, and text, and for coordinating user touch input locations with the location of displayed information so that the device 3010 can associate user contact at a location of a displayed item with the item. The mobile computing device 3010 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 3014, which may be a full qwerty keyboard or a traditional keypad that includes keys for the digits '0-9', '*', and '#.' The keyboard 3014 receives input when a user physically contacts or depresses a keyboard key. User manipulation of a trackball 3016 or interaction with a track pad enables the user to supply directional and rate of movement information to the mobile computing device 3010 (e.g., to manipulate a position of a cursor on the display device 3012).

The mobile computing device 3010 may be able to determine a position of physical contact with the touchscreen display device 3012 (e.g., a position of contact by a finger or a stylus). Using the touchscreen 3012, various "virtual" input mechanisms may be produced, where a user interacts with a graphical user interface element depicted on the touchscreen 3012 by contacting the graphical user interface element. An example of a "virtual" input mechanism is a "software keyboard," where a keyboard is displayed on the touchscreen and a user selects keys by pressing a region of the touchscreen 3012 that corresponds to each key.

The mobile computing device 3010 may include mechanical or touch sensitive buttons 3018a-d. Additionally, the mobile computing device may include buttons for adjusting volume output by the one or more speakers 3020, and a button for turning the mobile computing device on or off. A microphone 3022 allows the mobile computing device 3010 to convert audible sounds into an electrical signal that may be digitally encoded and stored in computer-readable memory, or transmitted to another computing device. The mobile computing device 3010 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 3010 may present a graphical user interface with the touchscreen 3012. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 3004. User-selection of the button may invoke the pre-defined action.

In some examples, the operating system provides a "desktop" graphical user interface that is displayed after turning on the mobile computing device 3010, after activating the mobile computing device 3010 from a sleep state, after "unlocking" the mobile computing device 3010, or after receiving user-selection of the "home" button 3018c. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 3010 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 3012 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 3010 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 3010 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 3010. The mobile device 3010 may include a digital camera sensor, and corresponding image and video capture and editing software. An internet browser may enable the user to view content from a web page by typing in an addresses corresponding to the web page or selecting a link to the web page.

The mobile computing device 3010 may include an antenna to wirelessly communicate information with the base station 3040. The base station 3040 may be one of many base stations in a collection of base stations (e.g., a mobile telephone cellular network) that enables the mobile computing device 3010 to maintain communication with a network 3050 as the mobile computing device is geographically moved. The computing device 3010 may alternatively or additionally communicate with the network 3050 through a Wi-Fi router or a wired connection (e.g., ETHERNET, USB, or FIREWIRE). The computing device 3010 may also wirelessly communicate with other computing devices using BLUETOOTH protocols, or may employ an ad-hoc wireless network.

A service provider that operates the network of base stations may connect the mobile computing device 3010 to the network 3050 to enable communication between the mobile computing device 3010 and other computing systems that provide services 3060. Although the services 3060 may be provided over different networks (e.g., the service provider's internal network, the Public Switched Telephone Network, and the Internet), network 3050 is illustrated as a single network. The service provider may operate a server system 3052 that routes information packets and voice data between the mobile computing device 3010 and computing systems associated with the services 3060.

The network 3050 may connect the mobile computing device 3010 to the Public Switched Telephone Network (PSTN) 3062 in order to establish voice or fax communication between the mobile computing device 3010 and another computing device. For example, the service provider server system 3052 may receive an indication from the PSTN 3062 of an incoming call for the mobile computing device 3010. Conversely, the mobile computing device 3010 may send a communication to the service provider server system 3052 initiating a telephone call using a telephone number that is associated with a device accessible through the PSTN 3062.

The network 3050 may connect the mobile computing device 3010 with a Voice over Internet Protocol (VoIP) service 3064 that routes voice communications over an IP network, as opposed to the PSTN. For example, a user of the mobile computing device 3010 may invoke a VoIP application and initiate a call using the program. The service provider server system 3052 may forward voice data from the call to a VoIP service, which may route the call over the internet to a corresponding computing device, potentially using the PSTN for a final leg of the connection.

An application store 3066 may provide a user of the mobile computing device 3010 the ability to browse a list of remotely stored application programs that the user may download over the network 3050 and install on the mobile computing device 3010. The application store 3066 may serve as a repository of applications developed by third-party application developers. An application program that is installed on the mobile computing device 3010 may be able to communicate over the network 3050 with server systems that are designated for the application program. For example, a VoIP application program may be downloaded from the Application Store 3066, enabling the user to communicate with the VoIP service 3064.

The mobile computing device 3010 may access content on the internet 3068 through network 3050. For example, a user of the mobile computing device 3010 may invoke a web browser application that requests data from remote computing devices that are accessible at designated universal resource locations. In various examples, some of the services 3060 are accessible over the internet.

The mobile computing device may communicate with a personal computer 3070. For example, the personal computer 3070 may be the home computer for a user of the mobile computing device 3010. Thus, the user may be able to stream media from his personal computer 3070. The user may also view the file structure of his personal computer 3070, and transmit selected documents between the computerized devices.

A voice recognition service 3072 may receive voice communication data recorded with the mobile computing device's microphone 3022, and translate the voice communication into corresponding textual data. In some examples, the translated text is provided to a search engine as a web query, and responsive search engine search results are transmitted to the mobile computing device 3010.

The mobile computing device 3010 may communicate with a social network 3074. The social network may include numerous members, some of which have agreed to be related as acquaintances. Application programs on the mobile computing device 3010 may access the social network 3074 to retrieve information based on the acquaintances of the user of the mobile computing device. For example, an "address book" application program may retrieve telephone numbers for the user's acquaintances. In various examples, content may be delivered to the mobile computing device 3010 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 3010 may access a personal set of contacts 3076 through network 3050. Each contact may identify an individual and include information about that individual (e.g., a phone number, an email address, and a birthday). Because the set of contacts is hosted remotely to the mobile computing device 3010, the user may access and maintain the contacts 3076 across several devices as a common set of contacts.

The mobile computing device 3010 may access cloud-based application programs 3078. Cloud-computing provides application programs (e.g., a word processor or an email program) that are hosted remotely from the mobile computing device 3010, and may be accessed by the device 3010 using a web browser or a dedicated program. Example cloud-based application programs include GOOGLE DOCS word processor and spreadsheet service, GOOGLE GMAIL webmail service, and PICASA picture manager.

Mapping service 3080 can provide the mobile computing device 3010 with street maps, route planning information, and satellite images. An example mapping service is GOOGLE MAPS. The mapping service 3080 may also receive queries and return location-specific results. For example, the mobile computing device 3010 may send an estimated location of the mobile computing device and a user-entered query for "pizza places" to the mapping service 3080. The mapping service 3080 may return a street map with "markers" superimposed on the map that identify geographical locations of nearby "pizza places."

Turn-by-turn service 3082 may provide the mobile computing device 3010 with turn-by-turn directions to a user-supplied destination. For example, the turn-by-turn service 3082 may stream to device 3010 a street-level view of an estimated location of the device, along with data for providing audio commands and superimposing arrows that direct a user of the device 3010 to the destination.

Various forms of streaming media 3084 may be requested by the mobile computing device 3010. For example, computing device 3010 may request a stream for a pre-recorded video file, a live television program, or a live radio program. Example services that provide streaming media include YOUTUBE and PANDORA.

A micro-blogging service 3086 may receive from the mobile computing device 3010 a user-input post that does not identify recipients of the post. The micro-blogging service 3086 may disseminate the post to other members of the micro-blogging service 3086 that agreed to subscribe to the user.

A search engine 3088 may receive user-entered textual or verbal queries from the mobile computing device 3010, determine a set of internet-accessible documents that are responsive to the query, and provide to the device 3010 information to display a list of search results for the responsive documents. In examples where a verbal query is received, the voice recognition service 3072 may translate the received audio into a textual query that is sent to the search engine.

These and other services may be implemented in a server system 3090. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 31:
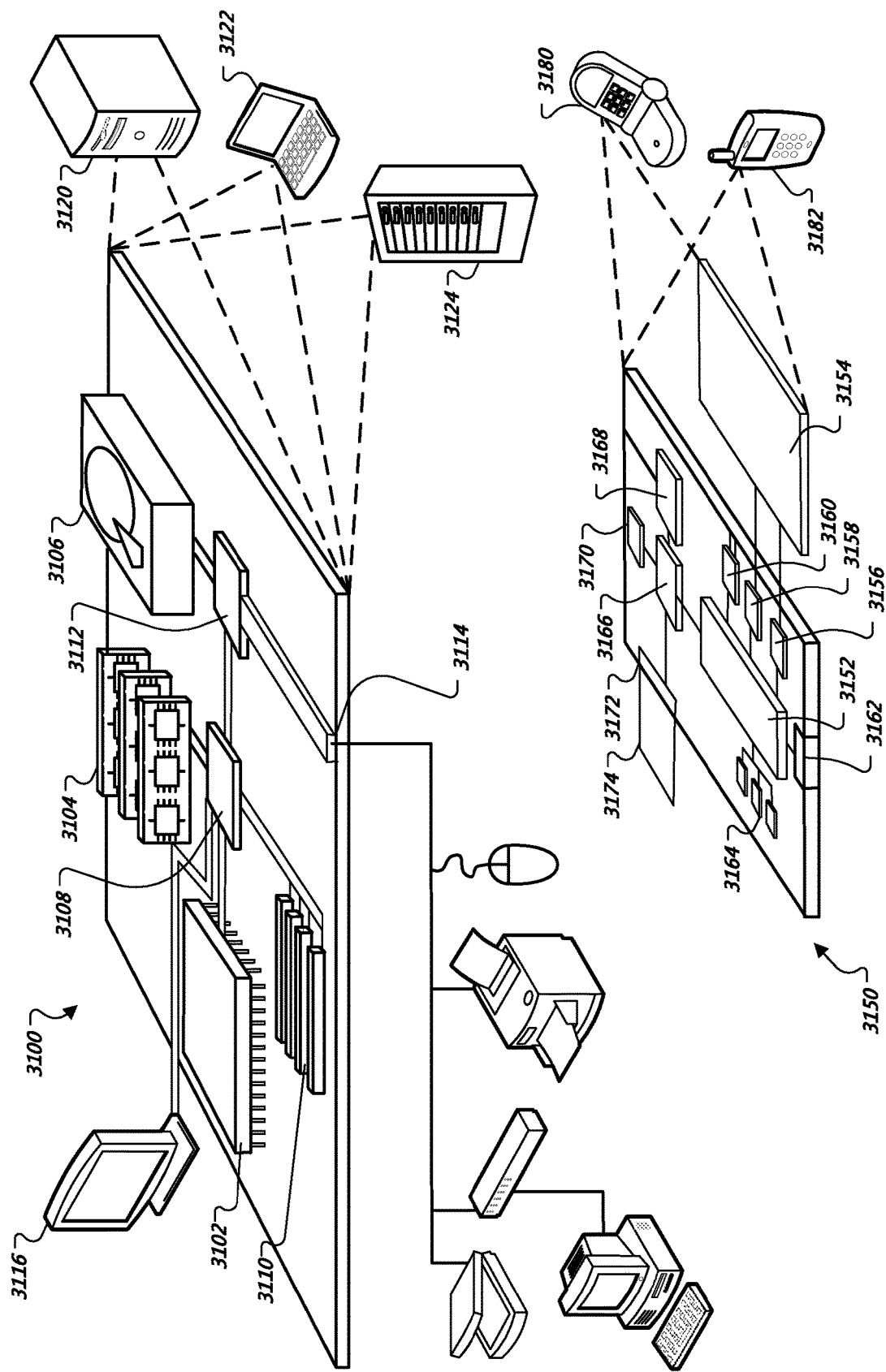
FIG. 31 is a block diagram of computing devices that may be used to implement the systems and methods described in this document, as either a client or as a server or plurality of servers.

FIG. 31 is a block diagram of computing devices 3100, 3150 that may be used to implement the systems and methods described in this document, as either a client or as a server or plurality of servers. Computing device 3100 is intended to represent various forms of digital computers, such as laptops, desktops, workstations, personal digital assistants, servers, blade servers, mainframes, and other appropriate computers. Computing device 3150 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 3100 includes a processor 3102, memory 3104, a storage device 3106, a high-speed interface 3108 connecting to memory 3104 and high-speed expansion ports 3110, and a low speed interface 3112 connecting to low speed bus 3114 and storage device 3106. Each of the components 3102, 3104, 3106, 3108, 3110, and 3112, are interconnected using various busses, and may be mounted on a common motherboard or in other manners as appropriate. The processor 3102 can process instructions for execution within the computing device 3100, including instructions stored in the memory 3104 or on the storage device 3106 to display graphical information for a GUI on an external input/output device, such as display 3116 coupled to high-speed interface 3108. In other implementations, multiple processors and/or multiple buses may be used, as appropriate, along with multiple memories and types of memory. Also, multiple computing devices 3100 may be connected, with each device providing portions of the necessary operations (e.g., as a server bank, a group of blade servers, or a multi-processor system).

The memory 3104 stores information within the computing device 3100. In one implementation, the memory 3104 is a volatile memory unit or units. In another implementation, the memory 3104 is a non-volatile memory unit or units. The memory 3104 may also be another form of computer-readable medium, such as a magnetic or optical disk.

The storage device 3106 is capable of providing mass storage for the computing device 3100. In one implementation, the storage device 3106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 3104, the storage device 3106, or memory on processor 3102.

The high-speed controller 3108 manages bandwidth-intensive operations for the computing device 3100, while the low speed controller 3112 manages lower bandwidth-intensive operations. Such allocation of functions is an example only. In one implementation, the high-speed controller 3108 is coupled to memory 3104, display 3116 (e.g., through a graphics processor or accelerator), and to high-speed expansion ports 3110, which may accept various expansion cards (not shown). In the implementation, low-speed controller 3112 is coupled to storage device 3106 and low-speed expansion port 3114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 3100 may be implemented in a number of different forms, as shown in the figure. For example, it may be implemented as a standard server 3120, or multiple times in a group of such servers. It may also be implemented as part of a rack server system 3124. In addition, it may be implemented in a personal computer such as a laptop computer 3122. Alternatively, components from computing device 3100 may be combined with other components in a mobile device (not shown), such as device 3150. Each of such devices may contain one or more of computing device 3100, 3150, and an entire system may be made up of multiple computing devices 3100, 3150 communicating with each other.

Computing device 3150 includes a processor 3152, memory 3164, an input/output device such as a display 3154, a communication interface 3166, and a transceiver 3168, among other components. The device 3150 may also be provided with a storage device, such as a microdrive or other device, to provide additional storage. Each of the components 3150, 3152, 3164, 3154, 3166, and 3168, are interconnected using various buses, and several of the components may be mounted on a common motherboard or in other manners as appropriate.

The processor 3152 can execute instructions within the computing device 3150, including instructions stored in the memory 3164. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 3150, such as control of user interfaces, applications run by device 3150, and wireless communication by device 3150.

Processor 3152 may communicate with a user through control interface 3158 and display interface 3156 coupled to a display 3154. The display 3154 may be, for example, a TFT (Thin-Film-Transistor Liquid Crystal Display) display or an OLED (Organic Light Emitting Diode) display, or other appropriate display technology. The display interface 3156 may comprise appropriate circuitry for driving the display 3154 to present graphical and other information to a user. The control interface 3158 may receive commands from a user and convert them for submission to the processor 3152. In addition, an external interface 3162 may be providing in communication with processor 3152, so as to enable near area communication of device 3150 with other devices. External interface 3162 may provide, for example, for wired communication in some implementations, or for wireless communication in other implementations, and multiple interfaces may also be used.

The memory 3164 stores information within the computing device 3150. The memory 3164 can be implemented as one or more of a computer-readable medium or media, a volatile memory unit or units, or a non-volatile memory unit or units. Expansion memory 3174 may also be provided and connected to device 3150 through expansion interface 3172, which may include, for example, a SIMM (Single In Line Memory Module) card interface. Such expansion memory 3174 may provide extra storage space for device 3150, or may also store applications or other information for device 3150. Specifically, expansion memory 3174 may include instructions to carry out or supplement the processes described above, and may include secure information also. Thus, for example, expansion memory 3174 may be providing as a security module for device 3150, and may be programmed with instructions that permit secure use of device 3150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 3164, expansion memory 3174, or memory on processor 3152 that may be received, for example, over transceiver 3168 or external interface 3162.

Device 3150 may communicate wirelessly through communication interface 3166, which may include digital signal processing circuitry where necessary. Communication interface 3166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 3168. In addition, short-range communication may occur, such as using a Bluetooth, WiFi, or other such transceiver (not shown). In addition, GPS (Global Positioning System) receiver module 3170 may provide additional navigation- and location-related wireless data to device 3150, which may be used as appropriate by applications running on device 3150.

Device 3150 may also communicate audibly using audio codec 3160, which may receive spoken information from a user and convert it to usable digital information. Audio codec 3160 may likewise generate audible sound for a user, such as through a speaker, e.g., in a handset of device 3150. Such sound may include sound from voice telephone calls, may include recorded sound (e.g., voice messages, music files, etc.) and may also include sound generated by applications operating on device 3150.

The computing device 3150 may be implemented in a number of different forms, as shown in the figure. For example, it may be implemented as a cellular telephone 3180. It may also be implemented as part of a smartphone 3182, personal digital assistant, or other similar mobile device.

Additionally, computing device 3100 or 3150 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

As additional description to the embodiments described above, the present disclosure describes the following embodiments.

Routing to One of Two Datasets

Embodiment 1 is a computer-implemented method. The method comprises receiving, by a computing system, a first query that was specified by user input at a computing device, wherein the computing system has access to one or more datasets of structured data and one or more datasets of unstructured data. The method comprises identifying, by the computing system, whether the one or more datasets of structured data have data for answering the first query. The method comprises requesting, by the computing system and as a result of having determined that the one or more datasets of structured data do not have data for answering the first query, a search of the one or more datasets of unstructured data that is based on the first query. The method comprises receiving, by the computing system, multiple results to the search of the one or more datasets of unstructured data, wherein the multiple results are each associated with a query relevance score that indicates a relevance to the first query. The method comprises providing, by the computing system, the multiple results for presentation by the computing device as responsive to the first query, in a ranked order that is based on the query relevance score for each of the multiple results.

Embodiment 2 is the computer-implemented method of embodiment 1, wherein identifying whether the one or more datasets of structured data have data for answering the first query includes: (i) requesting, by the computing system, that a process identify any one or more entities in the first query, (ii) receiving, by the computing system, an indication of one or more recognized entities in the first query, and (iii) determining, by the computing system, whether the one or more datasets of structured data store information for the one or more recognized entities, wherein a determination that the one or more datasets of structured data store information for the one or more recognized entities results in an identification that the one or more datasets of structured data have data for answering the first query, and wherein a determination that the one or more datasets of structured data do not store information for the one or more recognized entities results in an identification that the one or more datasets of structured data do not have data for answering the first query.

Embodiment 3 is the computer-implemented method of embodiments 1 or 2. The method comprises receiving, by the computing system, a second query that was specified by user input at the computing device. The method comprises identifying, by the computing system, whether the one or more datasets of structured data have data for answering the second query. The method comprises requesting, by the computing system and as a result of having determined that the one or more datasets of structured data have data for answering the second query, that a database query be performed on the one or more datasets of structured data. The method comprises receiving, by the computing system, a result to the database query that was performed on the one or more datasets of structured data. The method comprises providing, by the computing system, the result to the database query for presentation by the computing device as a sole result to the second query.

Embodiment 4 is the computer-implemented method of embodiment 3. The method further comprises identifying, by the computing system, a relevance score for the result to the database query. The method further comprises determining, by the computing system, whether the relevance score for the result to the database query satisfies a threshold value. The method further comprises providing, by the computing system as a result of determining that the relevance score for the result to the database query does not satisfy the threshold value, multiple suggested queries for presentation by the computing device along with the sole result to the second query, wherein the computing system is configured to not send the multiple suggested queries for presentation by the computing device as a result of a determination that the relevance score for the result to the database query satisfies the threshold value.

Embodiment 5 is the method of embodiment 4. The method further comprises identifying, by the computing system and for each of the multiple suggested queries, a query relevance score that identifies a relevance of the respective suggested query to the second query, wherein providing the multiple suggested queries for presentation by the computing device along with the sole result to the second query includes providing the multiple suggested queries in a ranked order based on the query relevance score for each of the multiple suggested queries.

Embodiment 6 is the method of any one of embodiments 1 through 6. The method further comprises determining, by the computing system, whether a query relevance score for a highest-ranked of the multiple results satisfies a threshold value. As a result of having determined that the query relevance score for the highest-ranked of the multiple results satisfies the threshold value, the computing system is configured to provide the multiple results for presentation by the computing device with the highest-ranking of the multiple results expanded and a remainder of the multiple results collapsed but user-expandable. As a result of having determined that the query relevance score for the highest-ranking of the multiple results does not satisfy the threshold value, the computing system is configured to provide the multiple results for presentation by the computing device with all of the multiple results collapsed but user-expandable.

Embodiment 7 is directed to one or more computer-readable device having instructions stored thereon, that when executed by one or more processors, cause the performance of actions according to the method of any one of embodiments 1 through 6.

Searching Multiple Datasets

Embodiment 1 is directed to a computer-implemented method. The method comprises receiving, by a computing system, a query that was specified by user input at a computing device. The method comprises identifying, by the computing system, multiple datasets that are available to be queried. The method comprises identifying, by the computing system, a ranking of the multiple datasets. The method comprises requesting, by the computing system, a search of a highest-ranked of the multiple datasets, based on the query. The method comprises determining, by the computing system, that the search of the highest-ranked of the multiple datasets did not yield a result. The method comprises requesting, by the computing system, a search of a lower-ranked of the multiple data sets in response to having determined that the search of the highest-ranked of the multiple datasets did not yield the result. The method comprises receiving, by the computing system, a result to the search of the lower-ranked of the multiple datasets. The method comprises providing, by the computing system, the result to the search of the lower-ranked of the multiple datasets for presentation by the computing device as responsive to the query that was specified by user input at the computing device.

Embodiment 2 is directed to the computer-implemented method of embodiment 1. The method comprises receiving, by the computing system, data that ranks the multiple datasets and that was specified by user input at the computing device.

Embodiment 3 is directed to the computer-implemented method of embodiment 1. The method comprises receiving, by the computing system, data that ranks the multiple datasets and that was specified by user input at another computing device while the another computing device was logged into a first user account. The method comprises determining, by the computing system, that the query that was specified by user input at the computing device occurred while the computing device was logged into a second user account. The method comprises associating, by the computing system, the ranking of the multiple data sets that was specified by the user input at the another computing device with the second user account, as a result of the first user account and the second user account being identified by the computing system as being associated with a same organization.

Embodiment 4 is directed to the computer-implemented method of embodiment 1, wherein the computing system is configured to query no additional dataset in the multiple data sets as a result of having received the result to the search of the lower-ranked of the multiple datasets, even though the multiple datasets include one or more datasets that are ranked lower than the lower-ranked of the multiple datasets.

Embodiment 5 is directed to the computer-implemented method of embodiment 1, wherein the computing system is configured to request searches of the multiple data sets in order based on the ranking of the multiple datasets until a result to one of the searches is received, at which point the computing system is configured to query no additional datasets of the multiple data sets.

Embodiment 6 is directed to the computer-implemented method of embodiment 1. The method comprises determining, by the computing system, that searches of each of the multiple datasets did not yield a result, wherein each of the multiple datasets is a dataset of structured data. The method comprises requesting, by the computing system and as a result of having determined that the searches of each of the multiple datasets did not yield a result, a search of one or more datasets of unstructured data that is based on the query. The method comprises receiving, by the computing system, multiple results to the search of the one or more datasets of unstructured data. The method comprises providing, by the computing system, the multiple results for presentation by the computing device as responsive to the query.

Embodiment 7 is the computer-implemented method of embodiment 1, wherein identifying, by the computing system, multiple datasets that are available to be queried includes: identifying, by the computing system, one or more entities in the query, and determining, by the computing system, the multiple datasets as being a subset of a plurality of datasets that are identified as storing information on the one or more recognized entities.

Embodiment 8 is directed to one or more computer-readable device having instructions stored thereon, that when executed by one or more processors, cause the performance of actions according to the method of any one of embodiments 1 through 7.

Selecting Datasets

Embodiment 1 is a computer-implemented method. The method comprises receiving, by a computing system, a query that was specified by user input at a computing device, wherein the query was specified by the user input while the computing device was logged into a particular user account. The method comprises identifying, by the computing system, a default set of multiple datasets that are available for searching. The method comprises identifying, by the computing system, one or more permissions associated with the particular user account. The method comprises identifying, by the computing system, one or more additional datasets that are available for searching due to the one or more permissions indicating that the particular user account has access to the one or more additional datasets. The method comprises requesting, by the computing system, a search of the default set of multiple datasets and the one or more additional datasets that is based on the query. The method comprises receiving, by the computing system, one or more results to the search of the default set of the multiple datasets and the one or more additional datasets. The method comprises providing, by the computing system, the one or more results for presentation by the computing device.

Embodiment 2 is the computer-implemented method of embodiment 1, wherein the permissions that are associated with the user account indicate that an organization with which the particular user account is affiliated has paid a license to access the one or more additional datasets.

Embodiment 3 is the computer-implemented method of embodiment 2, wherein the computing system stores: (i) second permissions associated with a second user account, and which indicate that a second organization with which the second user account is affiliated has paid a license to access the one or more additional datasets, wherein the computing system is configured to search the one or more additional datasets in response to receiving a query affiliated with the second user account, and (ii) third permissions associated with a third user account, and which indicate that a third organization with which the third user account is affiliated has not paid a license to access the one or more additional datasets, wherein the computing system is configured to not search the one or more additional datasets in response to receiving a query affiliated with the third user account.

Embodiment 4 is the computer-implemented method of embodiment 1. The method comprises receiving, by the computing system, a first portion of the one or more additional datasets from a different organization that is distinct from an organization that operates the computing system. The method comprises receiving, by the computing system, an indication from the different organization that the particular user account has paid for a license to access the first portion of the one or more additional datasets. The method comprises setting, by the computing system and as a result of having received the indication from the different organization, at least part of the one or more permissions associated with the particular user account to indicate that the first portion of the one or more additional datasets are available for searching by the particular user account.

Embodiment 5 is the computer-implemented method of embodiment 4. The method further comprises receiving, by the computing system, a second portion of the one or more additional datasets from another computing device while the another computing device was logged into another user account. The method comprises receiving, by the computing system, an indication from the another computing device, while the another computing device was logged into the another user account, that the particular user account is affiliated with a same organization as the another user account. The method comprises setting, by the computing system and as a result of having received the second portion of the one or more additional datasets from the another computing device and having received the indication that the particular user account is affiliated with the same organization as the another user account, at least part of the permissions associated with the particular user account, in order to specify that the second portion of the one or more additional datasets are available for searching by the particular user account.

Embodiment 6 is the computer-implemented method of embodiment 5, wherein the one or more results provided for presentation by the computing device include: (i) at least one result from the default set of multiple datasets, (ii) at least one result from the first portion of the one or more additional datasets, and (iii) at least one result from the second portion of the one or more additional datasets.

Embodiment 7 is directed to one or more computer-readable device having instructions stored thereon, that when executed by one or more processors, cause the performance of actions according to the method of any one of embodiments 1 through 6.

Saving Answers

Embodiment 1 is a computer-implemented method. The method comprises receiving, by a computing system, a query that was specified by user input at a computing device. The method comprises identifying, by the computing system, one or more results to the query. The method comprises providing, by the computing system, the one or more results for presentation by the computing device. The method comprises receiving, by the computing system, an indication that user input at the computing device provided input to save a user-selected result, of the one or more results, for later presentation. The method comprises receiving, by the computing system, a request to present the computing device with a display of saved results to search queries. The method comprises providing, by the computing system, data that is for receipt by the computing device and that is configured to cause the computing device to present the display of saved results to search queries, including a presentation of the user-selected result and a second user-selected result.

Embodiment 2 is the computer-implemented method of embodiment 1, wherein the data that is provided for receipt by the computing device is configured to cause the computing device to present: (i) the user-selected result along with the query that was specified by user input at the computing device, and (ii) the second user-selected result along with a second query for which the second result was identified as a result.

Embodiment 3 is the computer-implemented method of embodiment 2. The method comprises receiving, by the computing device, the second query as having been specified by user input at a second computing device, wherein the second query is different from the first query. The method comprises identifying, by the computing system, one or more second results to the second query. The method comprises providing, by the computing system, the one or more second results for presentation by the second computing device. The method comprises receiving, by the computing system, an indication that user input at the computing device provided input to save the second user-selected result, of the one or more second results, for later presentation.

Embodiment 4 is the computer-implemented method of embodiment 3. The method comprises identifying, by the computing system, that the user-selected result was selected by user input at the computing device while the computing device was logged into a first user account. The method comprises identifying, by the computing system, that the second user-selected result was selected by user input at the second computing device while the second computing device was logged into a second user account. The method comprises determining, by the computing system, that the first user account and the second user account are assigned to a same group profile of multiple user accounts. The method comprises selecting, by the computing system as a result of the computing system having determined that the first user account and the second user account are assigned to the same group profile, the user selected result and the second user-selected result for presentation by the computing device in the display of saved results to search queries, while the computing device is logged into the first user account, to the exclusion of results that were selected by user input at other computing devices while those computing device were logged into user accounts that are not assigned to the same group profile.

Embodiment 5 is the computer-implemented method of embodiment 4, wherein: the display of saved results includes an indication that the user-selected result was selected through use of the first user account; and the display of saved results includes an indication that the second user-selected result was selected through use of the second user account.

Embodiment 6 is the computer-implemented method of any one of embodiments 1 through 5. The method comprises receiving, by the computing system, an indication that user input at the computing device selected a particular saved-results screen, from among multiple saved-results screens, to which the user-selected result was to be saved. The method comprises receiving, by the computing system, an indication that user input at the computing device selected the particular saved-results screen to view, from among the multiple saved-results screens, wherein the computing system provides the data that is configured to cause the computing device to present the display of the saved results to search queries in response to having received the indication that the user input at the computing device selected the particular saved-results screen to view.

Embodiment 7 is directed to one or more computer-readable device having instructions stored thereon, that when executed by one or more processors, cause the performance of actions according to the method of any one of embodiments 1 through 6.

Recommending Questions.

Embodiment 1 is a computer-implemented method. The method comprises receiving, by a computing system, a request to provide a computing device with a list of suggested queries. The method comprises identifying, by the computing system, that a particular term has occurred frequently in documents that have published within a recent time period. The method comprises selecting, by the computing system as a result of having identified that the particular term has occurred frequently in documents that have published within the recent time period, a particular query to include in the list of suggested queries, from among a list of queries that have been previously submitted to the computing system, based on the computing system determining that the particular query includes the particular term. The method comprises providing, by the computing system, data for receipt by the computing device that is configured to cause the computing device to present the list of suggested queries, which includes the particular query. The method comprises receiving, by the computing system, an indication that user input at the computing device selected the particular query from the presented list of suggested queries. The method comprises identifying, by the computing system, one or more results to the particular query. The method comprises providing, by the computing system, the one or more results to the particular query for receipt and presentation by the computing device.

Embodiment 2 is the computer-implemented method of embodiment 1, wherein selecting the particular query to include in the list of suggested queries, based on the computing system determining that the particular query includes the particular term includes: assigning a score to the particular query that is more relevantly-weighted as a result of the particular query including the particular term than if the particular query did not include the particular term; and selecting queries to include in the list of suggested queries, including the particular query, based on scores of the queries.

Embodiment 3 is the computer-implemented method of embodiment 1, wherein the data that is provided for receipt by the computing device is configured to cause the computing device to present the list of suggested queries concurrently with a display of a text entry field with which user input is able to specify a query to which the computing system is able to identify a responsive result.

Embodiment 4 is the computer-implemented method of embodiment 1, wherein identifying, by the computing system, that the particular term has occurred frequently in documents that have published within the recent time period includes identifying that that the particular term has occurred more frequently in the documents that have published within the recent time period than in documents that were published within a time period that pre-dates the recent time period.

Embodiment 5 is the computer-implemented method of embodiment 1, wherein: the particular term is a name of an organization; and the documents that have published within the recent time period includes news articles that have published within at least the last day.

Embodiment 6 is the computer-implemented method of embodiment 1, wherein: the data that is configured to cause the computing device to present the list of suggested queries is provided to the computing device while the computing device is logged into a particular user account and is provided due to the computing device being logged into the particular user account. The method comprises identifying, by the computing system a collection of queries that have been submitted through use of user accounts that are assigned to a same group profile as the particular user account. The method comprises identifying, by the computing system, a second term that has occurred frequently in the collection of queries. The method comprises selecting, by the computing system as a result of having identified that the particular term has occurred frequently in the collection of queries, a second query to include in the list of suggested queries, from the collection of queries, based on the computing system determining that the second query includes the second term.

Embodiment 7 is the method of embodiment 6, wherein identifying the second term that has occurred frequently in the collection of queries includes identifying that the second term has occurred frequently over a second recent time period in the collection of queries.

Embodiment 8 is directed to one or more computer-readable device having instructions stored thereon, that when executed by one or more processors, cause the performance of actions according to the method of any one of embodiments 1 through 7.

Mapping Target to Channel.

Embodiment is a computer-implemented method. The method comprises receiving, by a computing system, a query that was specified by user input at a computing device, wherein the query specifies a keyword. The method comprises requesting, by the computing system, that a search be performed to identify a plurality of social network messages that were authored by multiple authors and that include the keyword. The method comprises requesting, by the computing system, an analysis of the identified plurality of social network messages to identify an aggregate profile of the group that specifies: (i) a first value for a first personality attribute of the group, and (ii) a first value for a second personality attribute of the group. The method comprises receiving, by the computing system, an indication that user input at the computing device selected a first type of publication from among multiple types of publications. The method comprises identifying, by the computing system, a publication profile for a publication of the first type of publication that was generated based on analysis of content contained in multiple instances of the publication of the first type of publication, the profile specifying: (i) a second value for a first personality attribute of the publication, and (ii) a second value for the second personality attribute of the publication. The method comprises determining, by the computing system, an alignment between the aggregate profile of the group and the publication profile by determining: (i) a first difference between the first value for the first personality attribute and the second value for the first personality attribute, and (ii) a second difference between the first value for the second personality attribute and the second value for the second personality attribute. The method comprises providing, by the computing system, information for receipt by the computing device that is configured to cause the computing device to present a graphical illustration of: (i) the first difference between the first value for the first personality attribute and the second value for the first personality attribute, and (ii) the second difference between the first value for the second personality attribute and the second value for the second personality attribute.

Embodiment 2 is the computer-implemented implemented method of embodiment 1, wherein: the query specifies a gender; and requesting that the search be performed includes requesting that the search identify social network messages that were authored by individuals of the gender.

Embodiment 3 is the computer-implemented implemented method of embodiment 1, wherein: the query specifies a date range; and requesting that the search be performed includes requesting that the search identify social network messages that were authored within the date range.

Embodiment 4 is the computer-implemented method of embodiment 1, wherein the multiple types of publications include newspapers, magazines, and digital media.

Embodiment 5 is the computer-implemented method of embodiment 1, wherein graphical illustration of the first difference and the second difference includes a first shape inside of a second shape, wherein the computing system is configured to generate the graphical illustration so that a correspondence between the first shape and the second shape illustrates a level of differences between personality attributes of the aggregate profile and the publication profile.

Embodiment 6 is directed to one or more computer-readable device having instructions stored thereon, that when executed by one or more processors, cause the performance of actions according to the method of any one of embodiments 1 through 5.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
    receiving, by a computing system, a query that was specified by user input at a computing device;
    identifying, by the computing system, multiple results to the query;
    providing, by the computing system, data that is for receipt by the computing device and that is configured to cause the computing device to present the multiple results along with multiple selectable user interface elements to save corresponding results, such that each respective result of the multiple results is presented along with a corresponding selectable user interface element to save the respective result;
    receiving, by the computing system, an indication that user input at the computing device selected a particular selectable user interface element of the multiple selectable user interface elements to save a corresponding user-selected result of the multiple results, for later presentation;
    receiving, by the computing system, a request to present the computing device with a display of saved results to search queries; and
    providing, by the computing system, data that is for receipt by the computing device and that is configured to cause the computing device to present the display of saved results to search queries, including a concurrent presentation of:
        (i) the user-selected result along with the query that was specified by user input at the computing device, and (ii) a second user-selected result along with a second query for which the second result was identified as a result.

2. The computer-implemented method of claim 1, further comprising:
receiving, by the computing system, the second query as having been specified by user input at a second computing device, wherein the second query is different from the query;
identifying, by the computing system, multiple second results to the second query;
providing, by the computing system, data that is for receipt by the second computing device and that is configured to cause the second computing device to present the multiple second results along with multiple second selectable user interface elements to save corresponding second results, such that each respective second result of the multiple second results is presented along with a corresponding second selectable user interface element to save the respective second result; and
receiving, by the computing system, an indication that user input at the second computing device selected a particular second selectable user interface element of the multiple second selectable user interface elements to save a corresponding second user-selected result of the multiple second results, for later presentation.

3. The computer-implemented method of claim 2, further comprising:
identifying, by the computing system, that the particular selectable user interface element was selected by user input at the computing device to save the user-selected result while the computing device was logged into a first user account;
identifying, by the computing system, that the second particular selectable user interface element was selected by user input at the second computing device to save the second user-selected result while the second computing device was logged into a second user account;
determining, by the computing system, that the first user account and the second user account are assigned to a same group profile of multiple user accounts; and
selecting, by the computing system as a result of the computing system having determined that the first user account and the second user account are assigned to the same group profile, the user-selected result and the second user-selected result for presentation by the computing device in the display of saved results to search queries, while the computing device is logged into the first user account, to the exclusion of results that were selected by user input at other computing devices while those computing devices were logged into user accounts that are not assigned to the same group profile.

4. The computer-implemented method of claim 3, wherein:
the display of saved results includes an indication that the user-selected result was saved through use of the first user account; and
the display of saved results includes an indication that the second user-selected result was saved through use of the second user account.

5. The computer-implemented method of claim 1, further comprising:
receiving, by the computing system, an indication that user input at the computing device selected a particular saved-results screen, from among multiple saved-results screens, to which the user-selected result was to be saved; and
receiving, by the computing system, an indication that user input at the computing device selected to view the particular saved-results screen, from among the multiple saved-results screens, each of the multiple saved results screens presenting multiple sets of a search result and a user-specified query to which the search result is responsive,
wherein the computing system provides the data that is configured to cause the computing device to present the display of the saved results to search queries in response to having received the indication that the user input at the computing device selected to view the particular saved-results screen.

6. One or more computer-readable devices including instructions that, when executed by one or more processors, cause performance of operations that comprise:
receiving, by a computing system, a query that was specified by user input at a computing device;
identifying, by the computing system, multiple results to the query;
providing, by the computing system, data that is for receipt by the computing device and that is configured to cause the computing device to present the multiple results along with multiple selectable user interface elements to save corresponding results, such that each respective result of the multiple results is presented along with a corresponding selectable user interface element to save the respective result;
receiving, by the computing system, an indication that user input at the computing device selected a particular selectable user interface element of the multiple selectable user interface elements to save a corresponding user-selected result of the multiple results, for later presentation;
receiving, by the computing system, a request to present the computing device with a display of saved results to search queries; and
providing, by the computing system, data that is for receipt by the computing device and that is configured to cause the computing device to present the display of saved results to search queries, including a concurrent presentation of:
(i) the user-selected result along with the query that was specified by user input at the computing device, and
(ii) a second user-selected result along with a second query for which the second result was identified as a result.

7. The one or more computer-readable devices of claim 6, wherein the operations further comprise:
receiving, by the computing system, the second query as having been specified by user input at a second computing device, wherein the second query is different from the query;
identifying, by the computing system, multiple second results to the second query;
providing, by the computing system, data that is for receipt by the computing device and that is configured to cause the second computing device to present the multiple second results along with multiple second selectable user interface elements to save corresponding second results, such that each respective second result of the multiple second results is presented along with a corresponding second selectable user interface element to save the respective second result; and receiving, by the computing system, an indication that user input at the second computing device selected a particular second selectable user interface element of the multiple second selectable user interface elements to save a corresponding second user-selected result of the multiple second results, for later presentation.

8. The one or more computer-readable devices of claim 7, wherein the operations further comprise:
identifying, by the computing system, that the particular selectable user interface element was selected by user input at the computing device to save the user-selected result while the computing device was logged into a first user account;
identifying, by the computing system, that the second particular selectable user interface element was selected by user input at the second computing device to save the second user-selected result while the second computing device was logged into a second user account;
determining, by the computing system, that the first user account and the second user account are assigned to a same group profile of multiple user accounts; and
selecting, by the computing system as a result of the computing system having determined that the first user account and the second user account are assigned to the same group profile, the user-selected result and the second user-selected result for presentation by the computing device in the display of saved results to search queries, while the computing device is logged into the first user account, to the exclusion of results that were selected by user input at other computing devices while those computing devices were logged into user accounts that are not assigned to the same group profile.

9. The one or more computer-readable devices of claim 8, wherein:
the display of saved results includes an indication that the user-selected result was saved through use of the first user account; and
the display of saved results includes an indication that the second user-selected result was saved through use of the second user account.

10. The one or more computer-readable devices of claim 6, wherein the operations further comprise:
receiving, by the computing system, an indication that user input at the computing device selected a particular saved-results screen, from among multiple saved-results screens, to which the user-selected result was to be saved; and
receiving, by the computing system, an indication that user input at the computing device selected to view the particular saved-results screen, from among the multiple saved-results screens, each of the multiple saved results screens presenting multiple sets of a search result and a user-specified query to which the search result is responsive,
wherein the computing system provides the data that is configured to cause the computing device to present the display of the saved results to search queries in response to having received the indication that the user input at the computing device selected to view the particular saved-results screen.

11. A computer-implemented method, comprising:
receiving, by a computing system, a first query that was specified by user input at a first computing device;
identifying, by the computing system, multiple first results to the first query;
providing, by the computing system, first data that is for receipt by the first computing device and that is configured to cause the first computing device to present the multiple first results along with multiple first selectable user interface elements to save corresponding first results, such that each respective first result of the multiple first results is presented along with a corresponding first selectable user interface element to save the respective first result;
receiving, by the computing system, an indication that user input at the first computing device selected a particular first selectable user interface element of the multiple first selectable user interface elements to save a corresponding single first user-selected result, from among the multiple first results, for later presentation;
receiving, by the computing system, a second query that was specified by user input at the first computing device, the second query being different from the first query;
identifying, by the computing system, multiple second results to the second query;
providing, by the computing system, second data that is for receipt by the first computing device and that is configured to cause the first computing device to present the multiple second results along with multiple second selectable user interface elements to save corresponding second results, such that each respective second result of the multiple second results is presented along with a corresponding second selectable user interface element to save the respective second result;
receiving, by the computing system, an indication that user input at the first computing device selected a particular second selectable user interface element of the multiple second selectable user interface elements to save a corresponding single second user-selected result, from among the multiple second results, for later presentation;
receiving, by the computing system, a request to provide the first computing device with user-selected results to search queries; and
providing, by the computing system and for receipt by the first computing device responsive to receiving the request to provide the first computing device with user-selected results to search queries, third data that is configured to cause the first computing device to present a first saved-results screen that concurrently includes:
(i) the first query along with the single first user-selected result selected from among the multiple first results due to user selection of the particular first selectable user interface element, and
(ii) the second query along with the single second user-selected result selected from among the multiple second results due to user selection of the particular second selectable user interface element.

12. The computer-implemented method of claim 11, wherein the first computing device was logged into a first user account with the computing system when:
(i) the first query was specified by user input at the first computing device,
(ii) user input selected the particular first selectable user interface element to save the single first user-selected result at the first computing device,
(iii) the second query was specified by user input at the first computing device, (iii) user input selected the particular second selectable user interface element to save the single second user-selected result at the first computing device, and
(iv) the computing system provided the third data for receipt by the first computing device; and the method further comprises:

receiving, by the computing system, a third query that was specified by user input at a second computing device while the second computing device was logged into a second user account with the computing system, wherein the third query is different from the first query and is different from the second query;

identifying, by the computing system, multiple third results to the third query;

providing, by the computing system, fourth data that is for receipt by the second computing device and that is configured to cause the second computing device to present the multiple third results along with multiple third selectable user interface elements to save corresponding third results, such that each respective third result of the multiple third results is presented along with a corresponding third selectable user interface element to save the respective third result;

receiving, by the computing system while the second computing device is logged into the second user account with the computing system, an indication that user input at the second computing device selected a particular third selectable user interface element of the multiple third selectable user interface elements to save a corresponding single third user-selected result, from among the multiple third results, for later presentation;

receiving, by the computing system, a request to provide the second computing device with user-selected results to search queries; and providing, by the computing system while the second computing device is logged into the second user account, responsive to receiving the request to provide the second computing device with user-selected results to search queries and responsive to identifying that the first user account with the computing system and the second user account with the computing system belong to a same group of user accounts with the computing system, fifth data that is for receipt by the second computing device and that is configured to cause the second computing device to present the first saved-results screen that concurrently includes:
(i) the first query along with the single first user-selected result,
(ii) the second query along with the single second user-selected result, and
(iii) the third query along with the single third user-selected result.

13. The computer-implemented method of claim 12, wherein the first saved results screen includes (i) the first query along with the single first user-selected result, (ii) the second query along with the single second user-selected result, and (iii) the third query along with the single third user-selected result, in distinction to the first saved results screen including a user-selected result saved through use of a user account with the computing system that does not belong to the same group of user accounts.

14. The computer-implemented method of claim 12, wherein the fifth data is configured to cause the second computing device to indicate on the first saved-results screen:
(i) that the first user account was used to save the single first user-selected result,
(ii) that the first user account was used to save the single second user-selected result, and
(iii) that the second user account was used to save the single third user-selected result.

15. The computer-implemented method of claim 11, further comprising:

receiving, by the computing system, an indication that user input at the first computing device indicated that the single first user-selected result is to be saved to the first saved-results screen from among a displayed listing of multiple saved-results screens that include the first saved-results screen and a second saved-results screen;

receiving, by the computing system, an indication that user input at the first computing device indicated that the single second user-selected result is to be saved to the first saved-results screen from among the displayed listing of the multiple saved-results screens that include the first saved-results screen and the second saved results screen;

receiving, by the computing system, a third query that was specified by user input at the first computing device;

identifying, by the computing system, multiple third results to the third query;

providing, by the computing system, the multiple third results for presentation by the first computing device as a response to the third query;

receiving, by the computing system, an indication that user input at the first computing device interacted with the presentation of the multiple third results to save a single third user-selected result, from among the multiple third results, for later presentation;

receiving, by the computing system, an indication that user input at the first computing device indicated that the single third user-selected result is to be saved to the second saved-results screen from the displayed listing of the multiple saved-results screens that include the first saved-results screen and the second saved-results screen;

receiving, by the computing system, an indication that user input at the first computing device selected to view the second saved-results screen through interaction with a presentation of a listing of the multiple saved-results screens; and providing, by the computing system responsive to having received the indication that user input selected to view the second saved-results screen, data that is for receipt by the first computing device and that is configured to cause the first computing device to present the second saved-results screen that concurrently includes the third query along with the single third user-selected result, wherein the computing system provides the third data for receipt by the first computing device responsive to the computing system having received an indication that user input at the first computing device selected to view the first saved-results screen through interaction with the presentation of the listing of the multiple saved-results screens.

* * * * *